US010363546B2

(12) United States Patent
Song et al.

(10) Patent No.: US 10,363,546 B2
(45) Date of Patent: Jul. 30, 2019

(54) MULTILAYER POLYMERIC MEMBRANE

(71) Applicants: Kwangjin Song, Charlotte, NC (US);
Jennifer M. Song, Nashville, TN (US);
Jane M. Song, Washington, DC (US)

(72) Inventors: Kwangjin Song, Charlotte, NC (US);
Jennifer M. Song, Nashville, TN (US);
Jane M. Song, Washington, DC (US)

(73) Assignee: Liso Plastics LLC, Charlotte, NC (US)

( * ) Notice: Subject to any disclaimer, the term of this patent is extended or adjusted under 35 U.S.C. 154(b) by 57 days.

(21) Appl. No.: 15/805,949

(22) Filed: Nov. 7, 2017

(65) Prior Publication Data

US 2018/0065105 A1 Mar. 8, 2018

Related U.S. Application Data

(63) Continuation-in-part of application No. 15/143,663, filed on May 2, 2016, now Pat. No. 9,694,344.

(51) Int. Cl.

| | | |
|---|---|---|
| *B01J 20/18* | (2006.01) | |
| *B01J 20/28* | (2006.01) | |
| *B01J 20/20* | (2006.01) | |
| *B01J 20/10* | (2006.01) | |
| *B01J 20/04* | (2006.01) | |
| *B01J 20/30* | (2006.01) | |
| *B01J 20/32* | (2006.01) | |
| *B01D 69/12* | (2006.01) | |
| *B01D 69/02* | (2006.01) | |
| *B01J 20/26* | (2006.01) | |

(52) U.S. Cl.
CPC ........ *B01J 20/28035* (2013.01); *B01D 69/02* (2013.01); *B01D 69/12* (2013.01); *B01J 20/041* (2013.01); *B01J 20/103* (2013.01); *B01J 20/18* (2013.01); *B01J 20/20* (2013.01); *B01J 20/205* (2013.01); *B01J 20/261* (2013.01); *B01J 20/28004* (2013.01); *B01J 20/2808* (2013.01); *B01J 20/28011* (2013.01); *B01J 20/28083* (2013.01); *B01J 20/28085* (2013.01); *B01J 20/305* (2013.01); *B01J 20/3007* (2013.01); *B01J 20/321* (2013.01); *B01D 2325/022* (2013.01); *B01D 2325/12* (2013.01); *Y02C 10/08* (2013.01)

(58) Field of Classification Search
CPC ......... B01J 20/18; B01J 20/20; B01J 20/3007
USPC ....................................................... 502/439
See application file for complete search history.

(56) References Cited

U.S. PATENT DOCUMENTS 9,694,344 B2 * 7/2017 Song .................. B01J 20/28035

* cited by examiner

*Primary Examiner* — Edward M Johnson

(57) ABSTRACT

Provided is a novel continuous single-step method of manufacturing a multilayer sorbent polymeric membrane having superior productivity, properties and performance. At least one layer of the polymeric membrane comprises sorbent materials and a plurality of interconnecting pores. The method includes: (a) coextruding layer-forming compositions to form a multilayer coextrudate; (b) casting the coextrudate into a film; (c) extracting the film with an extractant; and (d) removing the extractant from the extracted film to form the multilayer sorbent polymeric membrane. The sorbent membrane of this disclosure can find a wide range of applications for use in filtration, separation and purification of gases and fluids, $CO_2$ and volatile capture, structural support, vehicle emission control, energy harvesting and storage, electrolyte batteries, device, protection, permeation, packaging, printing, and etc.

52 Claims, 5 Drawing Sheets

US 10,363,546 B2

MULTILAYER POLYMERIC MEMBRANE

CROSS REFERENCE TO RELATED APPLICATIONS

This application is a continuation-in-part of U.S. application Ser. No. 15/143,663, filed May 2, 2016, now granted U.S. Pat. No. 9,694,344, the disclosure of which is incorporated herein by reference in its entirety.

FIELD OF THE INVENTION

This invention pertains to a novel method, and more specifically to a continuous single-step method, for making a multilayer sorbent polymeric membrane. This invention pertains further to a multilayer sorbent polymeric membrane manufactured by the method of this disclosure, and to an article, membrane, filter, module, device, packaging and printing materials, and process comprising the membrane of this disclosure.

BACKGROUND OF THE INVENTION

Flat-film polymeric membranes can be manufactured by the method of thermally induced phase separation (TIPS) or nonsolvent-induced phase inversion (NIPI). The membranes that result are either isotropic or anisotropic, depending on conditions and processes employed for their manufacture. Isotropic membranes are uniform throughout in composition and structure, and typically a monolayer film produced by the TIPS process. Anisotropic membranes, on the other hand, are asymmetric and produced often by the NIPI process. These asymmetric membranes may consist of a layered structure, e.g., a thin dense layer supported by a thick porous nonwoven substrate. In particular, flat-film polymeric membranes, which are filled with a large quantity of particulates, can find a wide range of applications for use in filtration, separation and purification of gases and fluids, $CO_2$ and volatile capture, vehicle emission control, energy harvesting and storage, electrolyte batteries, device, support, protection, permeation, packaging, printing, and etc. However, the filled membranes often suffer from poor productivity and performance, due to complexities of their manufacture involving multiple components and processes.

U.S. Pat. Nos. 4,342,811 and 4,550,123 disclose a porous polypropylene (PP) fiber and film for use as protective clothing. The PP membranes contain 10 to 50 wt. % active carbons. U.S. Pat. Nos. 4,833,172 and 8,388,878 disclose a method for producing a porous ultrahigh molecular weight polyethylene (UHMWPE) film for breathable and printing applications. The UHMWPE film contains 65 to 90 wt. % $SiO_2$. U.S. Pat. No. 5,964,221 discloses a $CO_2$ absorbent device, which comprises a porous UHMWPE sheet containing 96 to 99.6 wt. % $Ca(OH)_2$. These prior art membranes all are monolithic and symmetric in both structure and composition, composed either of a polymeric matrix of relatively low molecular weight (MW) or an extremely high content of inorganic particles. As a result, the membranes are often too low in strength or productivity for a commercially useful product. Moreover, the processed membranes yet retain a significant fraction of residual solvents, thereby greatly decreasing the performance of the particulate inclusions therein.

U.S. Pat. Nos. 4,877,679 and 5,032,450 disclose a multilayer absorbent polymeric membrane, produced by a discrete multistep process, i.e., laminating and/or coating one or more polymeric layers onto preformed microporous substrates. The preformed substrates are monolayer in structure and contain 50 to 90 wt. % $SiO_2$. Again, these membranes disclosed are low in productivity due to their complex manufacturing processes. The membranes also lack strong adhesion between layers, even though it may be improved to an extent via surface treatment, adhesives, ultrasound, heat and pressure techniques, and the like. However, any additional process lowers productivity further, and alters or contaminates the interface that adversely affects properties of the resulting laminate. Yet, despite such efforts, the disclosed laminates can hardly develop sufficient adhesion when the joint consists largely of foreign inclusions. U.S. Pat. No. 6,893,483 discloses a two-layer adsorbent membrane, prepared by merely winding low and high density substrates alternately.

The prior art sorbent membranes, in general, suffer from a range of drawbacks, due to the nature of the structure and process. It is therefore highly desirable to provide a new method that can improve significantly both productivity and performance of flat-film sorbent polymeric membranes.

SUMMARY OF THE INVENTION

This disclosure relates to a method for producing a novel multilayer sorbent polymeric membrane comprising at least one layer comprising sorbent materials of about 5 to about 100 wt. % and a plurality of interconnecting pores. The method includes: (a) coextruding layer-forming compositions comprising a matrix polymer through a film-forming die to form a multilayer coextrudate, wherein at least one of the layer-forming compositions further comprising the sorbent materials and a diluent; (b) cooling the multilayer coextrudate on a cast roll to form a multilayer film; (c) extracting the diluent from the multilayer film with an extractant; and (d) removing the extractant from the extracted film to form the multilayer sorbent polymeric membrane, wherein the matrix polymer is a film-forming thermoplastic polymer selected from the group of petroleum-based polymers, bio-based polymers, biodegradable polymers and combinations thereof; wherein the sorbent materials present in the at least one layer retain their initial sorbability and/or their initial porosity ($R_{SBT}$) of about 50 to about 100%; wherein the at least one layer has a porosity ($\phi_P$) of about 5% to about 85%; and wherein the multilayer sorbent polymeric membrane is asymmetric.

In one embodiment, the matrix polymer comprises at least one nonpolar polymer. In some embodiments, the sorbent materials are porous, characterized by an average particle size of about 100 μm or less, an average pore volume of about 3.5 cc/g or less, and an average Brunauer-Emmett-Teller (BET) surface area of about 5,000 m$^2$/g or less. In other embodiments, the diluent is selected from a renewable oil, characterized by an iodine value of about 100 g I$_2$/100 g or lower, an oleic content of about 50% or higher, an oxidation stability index (OSI) of about 10 hours or greater, or any combination thereof. In certain embodiments, the multilayer sorbent polymeric membrane consists of up to about 100 layers.

It is therefore an object of the present invention to provide a novel continuous single-step method for manufacturing a multilayer sorbent polymeric membrane of a wide range of materials, compositions and structures; the membrane providing superior productivity, superior properties and superior performance.

It is another object of the present invention to provide an easy and economic method of producing a sorbent polymeric membrane having superior sorption kinetics and capacity; excellent permselectivity towards $CO_2$, gases, organic volatiles and fluids, and water; exceptional mechanical strength; and little or no pressure drop of gases or fluids flowing across the membrane.

It is yet another object of the present invention to provide a novel sorbent polymeric membrane made according to the method of this disclosure.

Further objects of the present invention include: i) to provide a method of producing an asymmetric and/or bio-based polymeric membrane; ii) to provide a method of recovering substantially all the initial sorbability and/or porosity of sorbent materials present in a membrane; iii) to provide a method of producing superior adhesion between layers of a multilayer membrane; iv) to provide a method of manufacturing a sorbent membrane having excellent wettability towards nonpolar and/or polar substances; v) to provide a novel sorbent membrane for use as a separator for electrolyte batteries or energy storage devices; and vi) to provide a novel sorbent membrane for use as a support of an asymmetric NIPI membrane.

DETAILED DESCRIPTION OF THE INVENTION

Figures 1A, 1B, 1C:
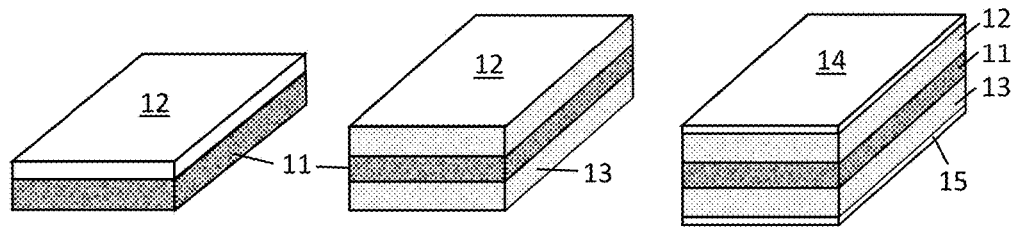
FIGS. 1a, 1b and 1c illustrate a schematic side view respectively of a two-layer membrane, a three-layer membrane and a five-layer membrane, according to some embodiments of the present disclosure.

Multilayer polymeric films are known in the art and manufactured typically by coextruding multiple polymeric melts through a film-forming die, as disclosed in great detail in U.S. Pat. Nos. 7,713,636, 8,142,893, 8,557,919 and 8,906,510. However, as outlined hitherto, the manufacture of multilayer sorbent flat-film polymeric membranes of an open pore structure is currently limited to discrete multistep processes, i.e., combinations of TIPS, NIPI, nonwoven, coating, lamination, and etc. Therefore, a continuous single-step flat-film process of the present invention for producing a multilayer sorbent polymeric membrane is surprising and novel, which provides immense benefits over the prior art process. This invention significantly improves the efficiency of the manufacturing process, while providing great versatility in design of porous membrane products. The invention enables an easy and economic production of multilayer sorbent polymeric membranes of a wide variety of materials, compositions and structures, which are otherwise impossible or very difficult to manufacture by prior art techniques into commercially useful products.

In the simplest case, the invention can produce a stable monolayer membrane of superior productivity, superior sorbability and superior strength, by extruding the at least one of the layer-forming compositions comprising a matrix polymer, sorbent materials and a diluent. The membrane may consist up to about 100% of various sorbent materials at different compositions. In a still simple case, the invention can produce an asymmetric two-layer membrane of superior sorbability and superior permselectivity over $CO_2$, gases, organic volatiles and fluids, and water, by coextruding a highly functional skin layer on a side of a sorbent core layer composed of the at least one of the layer-forming compositions.

The invention can produce a membrane consisting of up to about 100 layers, in which each layer may provide, separately or in combination, various advantageous functions, e.g., such as absorption, adsorption, regenerability, permeation, selectivity, permselectivity, separation, support, wettability, conductivity, adhesion, sealability, printability, protection, barrier, dissipation, compliance, transition, storage, and the like. The membrane can be oriented to significantly further improve properties and performance, while lowering materials cost by thinning the gauge. It is of great surprise that the multilayer membrane of this disclosure has superior strength, superior performance, no delamination of layers, little or no residual solvents, and restores substantially all the pristine properties, such as sorbability, porosity and activity, of the sorbent materials inclusions. This is a remarkable improvement over the prior art product.

Various specific embodiments, versions and examples of the invention are described, including preferred embodiments and definitions that are adopted herein for purposes of understanding the claimed invention. While the following detailed description gives specific preferred embodiments, those skilled in the art will appreciate that these embodiments are exemplary only and that the invention can be practiced in other ways.

As used herein, the singular terms "a", "an" and "the" include plural referents, unless specified otherwise. Likewise, the plural term "multilayer" as used herein includes a singular referent comprising a monolithic or monolayer structure, unless specified otherwise.

As used herein, the term "micropore" refers to a pore with a size ≤2 nm, the term "mesopore" refers to a pore with a size between 2 and 50 nm, and the term "macropore" refers to a pore with a size ≥50 nm. Unless specified otherwise, the term "porous" as used herein refers to microporous, mesoporous, macroporous and combinations thereof.

As used herein, the term "sheet" is interchangeable with film. Unless specified otherwise, the term "film" as used herein is interchangeable with "membrane" and also refers to a thinner sheet or a precursor membrane.

As used herein, unless specified otherwise, the term "polymer" includes homopolymers and copolymers, linear and branched, nonpolar and polar, hydrophobic and hydrophilic, and nonporous and porous polymers.

As used herein, unless specified otherwise, the term "copolymer" refers to a polymer formed by polymerization of at least two different monomers, comprising random, alternating, block, and graft copolymers.

As used herein, unless specified otherwise, the term "sorbability" refers to a sorption ability of a sorbent material.

As used herein, the term "a particle size" or "size" refers to a diameter for spherically shaped particles and to a thickness for fibers, whiskers, wires, platelets, and the like.

As used herein, unless specified otherwise, the term "immiscible" refers to the property of a material, which when blended with others, does not form in all proportions a homogeneous single-phase solution on a molecular level.

Layer-Forming Compositions

A multilayer polymeric membrane of the present invention is made from layer-forming compositions comprising a matrix polymer, wherein at least one of the layer forming compositions further comprises sorbent materials and a diluent. The matrix polymer is to bind together the sorbent materials within. The sorbent materials are to provide desirable functions to the membrane. The diluent is to dissolve the polymer during manufacture; and then, to be extracted out of the film leaving behind a plurality of interconnecting pores. The layer-forming compositions may differ to each other in components, depending on desired properties and applications of the resultant membrane.

The at least one of the layer-forming compositions may comprise: i) a matrix polymer of about 0.1 to about 70 wt. %, preferably about 0.5 to about 60 wt. % and more preferably about 1 to about 50 wt. %; ii) sorbent materials of about 5 to about 90 wt. %, preferably about 10 to about 85 wt. % and more preferably about 15 to about 80 wt. %; iii) a diluent of about 5 to about 90 wt. %, preferably about 10 to about 85 wt. % and more preferably about 15 to about 80 wt. %; and iv) optionally, an additive of up to about 15 wt. %.

In a preferred embodiment, the at least one of the layer-forming compositions, upon removing the diluent, contains the sorbent materials of about 5 to about 100 wt. %. The diluent-removed at least one of the layer-forming compositions may contain the sorbent materials of ≥about 10 wt. %, preferably ≥about 20 wt. %, more preferably ≥about 30 wt. %, more preferably ≥about 40 wt. %, more preferably ≥about 50 wt. %, more preferably ≥about 60 wt. %, more preferably ≥about 70 wt. %, more preferably ≥about 80 wt. %, more preferably ≥about 90 wt. % and even more preferably about 100 wt. %.

The multilayer membrane can be produced from a wide range of feedstock materials comprising petroleum-based materials, bio-based materials, biodegradable materials and combinations thereof. In some embodiments, the feedstock materials are petroleum-based materials. In other embodiments, the feedstock materials are selected from bio-based materials and their mixtures of petroleum-based materials.

Matrix Polymers

The matrix polymer of this disclosure is a film-forming thermoplastic polymer selected from the group of petroleum-based polymers, bio-based polymers, biodegradable polymers and combinations thereof. A wide range of thermoplastics, including any membrane-forming polymer known in the art, can be conveniently used as the matrix. In one embodiment, the film-forming thermoplastic polymer is nonpolar, polar, sorbent or any combination thereof. A nonpolar-polar combination may improve wettability and sorbability of the membrane towards selective species. In a preferred embodiment, the film-forming thermoplastic polymer has a high or ultrahigh molecular weight.

The polymer may have a weight average molecular weight (Mw) of about $1 \times 10^4$ to about $2 \times 10^7$ g/mol, preferably about $5 \times 10^4$ to about $2 \times 10^7$ g/mol and more preferably about $1 \times 10^5$ to about $2 \times 10^7$ g/mol. The Mw can be measured with gel permeation chromatography (GPC) according to ASTM D 6474 for polyolefin (PO), ASTM D 5296 for polystyrene (PS) and polyester, or the like. Although not particularly restricted, the polymer may have a polydispersity index (MWD), i.e., a molecular weight distribution defined as Mw/Mn, of about 1 to about 100, preferably about 1 to about 60, more preferably about 1 to about 30, and more preferably about 1 to about 15. The Mn represents a number average molecular weight.

The matrix polymer may have a unimodal or multimodal MWD. A multimodal MWD polymer may comprise one or more components, and preferably less than about 5 components, of the same polymer, a polymer of the same family, a miscible polymer, a copolymer, or combinations thereof. Each of the component polymers may differ from each other in molecular weight (MW); or may have a unimodal, bimodal, or multimodal MWD. A preferred multimodal polymer may consist of the same polymers of different MWs. The multimodal MWD may be characterized by one or more peaks or inflection points in GPC, resulting respectively from the components of a low molecular weight (LMW), a high molecular weight (HMW), or an ultrahigh molecular weight (UHMW). The multimodal MWD polymer can be prepared by extruder or reactor blending or by any suitable means, as disclosed in, e.g., U.S. Pat. Nos. 4,461,873, 7,163,906, 8,101,687, 8,148,470, and 9,637,573.

In some embodiments, the matrix polymer has a unimodal or multimodal MWD comprising at least one of: a) an UHMW component of 0 to about 70 wt. % having an Mw greater than about 1,000,000 g/mole; b) a HMW component of about 30 to 100 wt. % having an Mw of about 10,000 to about 1,000,000 g/mole; or c) a LMW component of 0 to about 70 wt. % having a Mw less than about 10,000 g/mole. In certain embodiments, the multimodal polymer comprises at least one HMW component in the amount of greater than about 10, 30, 50, 60, 70, 80, or 90 wt. %; or in the range of about 20 to 100 wt. %, preferably about 30 to 100, about 40 to 100, about 50 to 100, about 60 to 100, and about 70 to 100 wt. %. In certain embodiments, the multimodal polymer comprises at least one UHMW component less than about 80, 70, 60, 50, 40, or 30 wt. %; or in the range of about 0.01 to about 80 wt. %, preferably about 0.5 to 70, about 1 to 60, about 1 to 50, about 1 to 40, and about 1 to 30 wt. %.

In some embodiments, the matrix polymer is polyolefin (PO) or polyketone (PK) characterized by: a) an Mw of about 1,000 to about 100,000,000 g/mole and b) a unimodal or multimodal MWD comprising at least one of: i) an UHMW component having an Mw greater than about 1,000,000 g/mole in the amount of 0 to about 70 wt. %; preferably 0 to about 60, 0 to about 50, 0 to about 40, 0 to about 30, and 0 to about 20 wt. %; ii) a HMW component having an Mw of about 100,000 to about 1,000,000 g/mole in the amount of about 30 to 100 wt. %, preferably about 40 to 100, about 50 to 100, about 60 to 100, and about 70 to 100 wt. %; and iii) a LMW component having an Mw less than about 100,000 g/mole and preferably in the range of about 1,000 to about 100,000 g/mole, in the amount of 0 to about 70 wt. %, preferably 0 to about 60, 0 to about 50, 0 to about 40, 0 to about 30, and 0 to about 20 wt. %.

The nonpolar polymers may include polyolefin (PO), fluoropolymers (FLPs) comprising polytetrafluoroethylene (PTFE), polystyrene (PS) comprising isotactic PS (iPS) and syndiotactic PS (sPS), hydrophobic polymers, copolymers thereof, derivatives thereof and combinations thereof. The PO polymer may be produced by Ziegler-Natta catalysts, metallocene catalysts or any other suitable means, as described in U.S. Pat. Nos. 7,713,636 and 8,142,893.

Non-limiting examples of the PO polymer include polyethylene (PE), polypropylene (PP), poly(4-methyl-1-pentene) (PMP), polybutene-1 (PB-1), polyisobutylenes (PIB), thermoplastic elastomers (TPEs) thereof, copolymers thereof, modifications thereof, and combinations thereof. The PE comprises ultrahigh molecular weight polyethylene (UHMWPE), high density polyethylene (HDPE), medium density polyethylene (MDPE), low density polyethylene (LDPE), linear low density polyethylene (LLDPE), branched low density polyethylene (BLDPE), very low density polyethylene (VLDPE), ultralow density polyethylene (ULDPE), and the like. The PP comprises ultrahigh molecular weight polypropylene (UHMWPP), isotactic polypropylene (iPP), syndiotactic polypropylene (sPP), (β-nucleated polypropylene (β-PP), β-nucleated ultrahigh molecular weight polypropylene (β-UHMWPP), high-crystalline polypropylene (HCPP), high melt-strength polypropylene (HMS-PP), mini-random PP (mr-PP), and the like. The β-PP and β-UHMWPP may comprise a β-nucleating agent, as described in U.S. Pat. No. 6,828,019.

Non-limiting examples of the polar polymers include polyester, such as polyethylene terephthalate (PET), polytrimethylene terephthalate (PTT), polybutylene terephthalate (PBT), polyethylene naphthalate (PEN), polybutylene naphthalate (PBN), polylactic acid (PLA), polyethylene furanoate (PEF), polybutylene furanoate (PBF), polyhydroxyalkanoate (PHA), polycaprolactone (PCL), polycyclohexylenedimethylene terephthalate (PCT), and polycarbonate (PC); polyamide (PA), such as amorphous polyamides, crystalline polyamides, PA6, PA11, PA12, PA46, PA410, PA66, PA610, PA612, PA1010, PA1012, PA MXD6, PA6T, PA8T, PA10T, PA6T/DT (D: 2-methyl pentamethylene diamine), PA6I/6T, and polyphthalamide (PPA); polyhydroxyether (PHE), such as polyhydroxyl amino ether, polyhydroxyl amide ether and polyhydroxyl ether of bisphenol A; cellulose and cellulose derivatives, such as cellulose acetates (CA), cellulose acetate propionates (CAP), cellulose acetate butyrates (CAB), carboxymethyl celluloses, cellulose nitrates and ethyl celluloses; polyphenylene oxide (PPhO); acrylic polymers (PAcs), such as polyacrylic acid (PAA), polyacrylonitrile (PAN) and polyvinyl acetate (PVA); fluoropolymers (FLPs), such as polyvinylidene fluoride (PVDF), poly(vinylidene fluoride-co-hexafluoropropylene) (PVdF-HFP), poly(tetrafluoroethylene-co-perfluoropropyl vinyl ether) (PTFE-c-PFPVE), polychlorotrifluoroethylene (PCTFE), polyvinyl fluoride (PVF) polyethylenechlorotrifluoroethylene (ECTFE), copolymers of tetrafluoroethylene and ethylene (ETFE), perfluorinated ethylene-propylene copolymer (FEP), and tetrafluoroethylene-perfluorovinyl ether copolymer (PFA); poly(p-phenylene sulfide) (PPS); polyimide (PI); polyetherimide (PEI); polyketone (PK); polyether ether ketone (PEEK); polysulfone (PSU); polyethersulfone (PES); polyvinyl chloride (PVC); polyether, such as polyethylene oxide (PEO), polypropylene oxide (PPO) and polyoxymethylene (POM); polyvinyl alcohol (PVOH); ethylene vinyl alcohol copolymer (EVOH); polysiloxane such as polydimethylsiloxane (PDMS); ionomers thereof, such as neutralized poly(ethylene-co-acrylic acid), sulfonated perfluorocarbon, acrylic and fluorinated ionomers, and lithium/sodium/zinc ionomers; thermoplastic elastomers (TPEs) thereof, such as poly(ester-b-amide), poly(ether-b-ester) and poly(ether-b-amide); copolymers thereof; derivatives thereof; blends thereof with polyolefin; and mixtures thereof.

Polyketone (PK) of this disclosure is a linear alternating copolymer of carbon monoxide (CO) and one or more olefins comprising: a copolymer of CO and ethylene; a terpolymer of CO, ethylene and a second olefin of at least 3 carbon atoms; or combinations thereof, as disclosed in, e.g., U.S. Pat. Nos. 3,694,412, 3,835,123, 4,880,903, 5,073,327, 5,229,343, and 5,229,445. The second olefin may comprise: i) aliphatic, such as α-olefins of propylene, 1-butene, isobutylene, 1-hexene or 1-decene; ii) arylaliphatic, such as styrene or ring-alkylated styrenes; or iii) combinations thereof. The PK contains substantially one CO molecule per each molecule of ethylenically unsaturated hydrocarbon. A preferred PK is a copolymer, a terpolymer, or mixtures thereof, represented by a formula below:

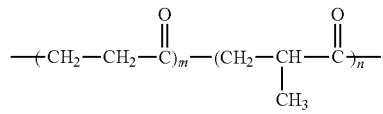

wherein m is an integer greater than 1; n is an integer greater than 0; and the second olefin is propylene in the amount of 0.1 to 10 mole %, preferably 0.2 to 7 mole %, and more preferably 0.3 to 5 mole %.

A preferred petroleum-based polymer comprises PE, UHMWPE, HDPE, ULDPE, PP, iPP, HCPP, HMS-PP, UHMWPP, β-PP, β-UHMWPP, sPS, iPS, PAcs, polyester, PC, PA, PK, PEEK, cellulose, PPhO, FLPs, PVDF, PPS, PI, PSU, PES, PVC, ionomers thereof, TPEs thereof, copolymers thereof, derivatives thereof, or combinations thereof.

A preferred bio-based or biodegradable polymer comprises PO, such as PE, UHMWPE, HDPE, ULDPE, PP, UHMWPP, iPP, HCPP, β-PP and β-UHMWPP; PK; polyester, such as PTT, PLA, PEF, PBF, PC, PHAs, polyhydroxybutyrate (PHB), polybutylene adipate-co-terephthalate (PBAT), polycaprolactone (PCL) and poly(ether-b-ester); PA, such as PA11, PA12, PA410, PA610, PA612, PA1010, PA1012, PPA, amorphous PA and poly(ether-b-amide) (PEBAX); cellulose and cellulose derivatives, such as CA, CAP, CAB, carboxymethyl celluloses, cellulose nitrates and ethyl celluloses; polysaccharides; thermoplastic starches (TPSs); copolymers thereof; derivatives thereof; or combinations thereof.

A preferred sorbent polymer comprises polar polymers, polyacrylates (PAcs), super absorbent polymers (SAPs), PAN, porous polymers, hydrophilic polymers, PA, polysaccharides, cellulose, copolymers thereof, derivatives thereof, or combinations thereof.

Coating Polymers

Optionally, the membrane may be coated at least once with at least one primer and/or at least one coating polymer. Non-limiting examples of the coating polymers include chitosan and cellulose derivatives, polyamide (PA), poly(ether-b-amide) (PEBAX), poly(ether-b-ester), polyethylene imine, polydimethylsiloxane (PDMS), polyvinylamine (PVAm), polyhydroxyethers (PHEs), polymers with intrinsic microporosity (PIMs), polydicyclopentadiene (PDCPD), polyphenylene oxide (PPhO), polyvinyl alcohol (PVOH), polyacrylic acid (PAA), polyurethane (PU), polyurea (PUA), polyamide imide (PAI), polyphosphazene (PPz), polyaliphatic terpene (PAT), poly(l-trimethylsilyl-1-propyne) (PTMSP), polyvinyl ether (PVE), polydopamine (PDA), epoxy and alkyd resins, copolymers thereof, derivatives thereof and combinations thereof. A preferred coating is water-borne and/or crosslinkable.

Sorbent Materials

The sorbent materials may comprise absorbents, adsorbents or combinations thereof. The materials may effectively separate, remove or store substances, such as element, ion, molecule, moisture, vapor, gas, liquid, solid, particle, metal, impurity, contaminant and the like present in solid, liquid and/or gas streams. Properties of the sorbent materials, such as sorption kinetics and capacity, permselectivity, compatibility, regenerability, etc., may vary depending on their composition, size, morphology, surface chemistry and etc. The sorbent materials may promote reaction as catalyst.

The sorbent materials may be divided into two groups, i.e., sorbent polymers and sorbent fillers, depending on their role and morphology in the membrane. The materials can form a matrix phase or act as fillers to form a disperse or co-continuous phase. The materials may assume a wide range of characteristics, i.e., natural or synthesized, porous or substantially nonporous, inorganic or organic, crystalline or amorphous, nano- or micron-sized, hydrophilic or hydrophobic, surface modified, doped and/or coated, or any combination thereof. The materials may assume a variety of forms, such as platelet, particle, granule, bead, sphere, pellet, fiber, flake, wire, whisker, tube and the like.

In one embodiment, the sorbent materials are sorbent polymers that form a matrix phase. Preferably, a sorbent matrix polymer is stable and stretchable at elevated film processing conditions. The sorbent matrix polymer may preferably include porous polymers. In other embodiments, the sorbent materials are sorbent fillers. The fillers may have a bulk density $\sigma_B \leq$ about 3.5 g/cc, an average particle size $D_{50} \leq$ about 200 μm, an average aspect ratio, i.e., a ratio of length (L) to thickness (t), $\gamma_A$ about $\leq 2,000$, an average pore volume $\phi_S \leq$ about 6.0 cc/g, and an average Brunauer-Emmett-Teller (BET) surface area $A_{BET} \leq$ about 7,000 m$^2$/g.

The $\sigma_B$ may be about 0.001 to about 0.01 g/cc, about 0.01 to about 0.1 g/cc, about 0.1 to about 1.0 g/cc, about 1.0 to about 2.0 g/cc, or about 2.0 to about 3.5 g/cc. The $\gamma_A$ may be about 0.01 to about 10, about 10 to about 100, about 100 to about 1,000, or about 1,000 to about 2,000. The $D_{50}$ may be about 0.1 nm to about 100 nm, about 100 nm to about 500 nm, about 500 nm to about 1,000 nm, about 1 μm to about 50 μm, about 50 μm to about 100 μm, or about 100 μm to about 200 μm. The $\phi_S$ may be from about 0.001 to about 0.1 cc/g, about 0.1 to about 0.5 cc/g, about 0.5 to about 1.0 cc/g, about 1.0 to about 1.5 cc/g, about 1.5 to about 2.0 cc/g, about 2.0 to about 2.5 cc/g, about 2.5 to about 3.5 cc/g, about 3.5 to about 4.0 cc/g, about 4.0 to about 5.0 g/cc, or about 5.0 to about 6.0 g/cc. The $A_{BET}$ may be about 0.001 to about 1 m$^2$/g, about 1 to about 50 m$^2$/g, about 50 to about 100 m$^2$/g, about 100 to about 1,000 m$^2$/g, about 1,000 to about 2,000 m$^2$/g, about 2,000 to about 3,000 m$^2$/g, about 3,000 to about 4,000 m$^2$/g, about 4,000 to about 5,000 m$^2$/g, or about 5,000 to about 7,000 m$^2$/g.

In some embodiments, the sorbent fillers are porous, characterized by a $D_{50}$ of about 1 nm to about 100 μm, a $\phi_S$ of about 0.1 to about 3.5 cc/g, an $A_{BET}$ of about 0.1 to about 5,000 m$^2$/g, or any combination thereof. The fillers may have a broad size distribution, a large $\phi_S$, a large $A_{BET}$, or combinations thereof. The fillers may have a hollow core-porous shell nanostructure with a varying core-to-shell diameter ratio. In certain embodiments, the sorbent fillers are substantially nonporous, characterized by a $\phi_S \leq$ about 0.5 cc/g and an $A_{BET} \leq$ about 500 m$^2$/g. The fillers may sorb or soak a diluent of about 10 wt. % or less. In a preferred embodiment, the sorbent fillers are nanosized with a $D_{50}$ of about 0.1 nm to about 1,000 nm.

Non-limiting examples of the inorganic sorbent materials include metal oxides and hydroxides, metalloid oxides and hydroxides, siliceous materials, limestone, $CaCO_3$, $Li_2CO_3$, $K_2CO_3$, clay, zeolites, zeotypes, xerogels, aerogels and combinations thereof. The inorganic sorbents may be used in a hydrated or anhydrous state. The metal and metalloid compounds may include $Li_2O$, $CaO$, $MgO$, $MnO$, $ZnO$, $NiO$, $CuO$, $Ag_2O$, $TiO_2$, $ZrO_2$, $SbO_2$, $Al_2O_3$, $AlOx$ ($1 \leq x \leq 3$), $Fe_3O_4$, $\gamma$-AlO(OH) (Boehmite), $NaOH$, $LiOH$, $KOH$, $Ca(OH)_2$, derivatives thereof and combinations thereof. The siliceous materials may comprise silica and silicates, including fumed and precipitated silica; $SiOx$ ($1 \leq x \leq 3$); colloidal silica; organosilica; ethoxysilane; silica gel; boro-silicate porous glass; aerogel; silica nanotube; mesoporous silicates, such as MCM-41, MCM-48, SBA-1, SBA-15, SBA-16, NFM-1, FDU-1, FDU-12, AMS-6 and AMS-8; phyllosilicates, such as smectite, palygorskite, montmorillonite, hectorite, saponite, halloysite, sepiolite, tuperssuatsiaite, yofortierite, kalifersite, falcondoite, loughlinite and organosilicate; derivatives thereof; or combinations thereof.

The zeolites and zeotypes may include zeolite A, such as 4A and 5A; zeolite D; zeolite L; zeolite P; zeolite X, such as 10X and 13X; zeolite Y; zeolite β; ZSM; ETS-4 and 10; zorite; silicoalumino phosphates (SAPO); aluminophosphate ($AlPO_4$); analcime; chabazite; clinoptilolite; erionite; ferrierite; heulandite; laumonitte; mordenite; mesolite; scolecite; stilbite; derivatives thereof; or combinations thereof.

Non-limiting examples of the organic sorbent materials include carbonaceous materials, organic-inorganic hybrids, porous polymers, sorbent polymers and mixtures thereof. The carbonaceous materials may comprise activated carbon, carbon black, carbon molecular sieve, carbon fiber, carbide-derived carbon, fullerene, carbon nanotube, graphene, graphene oxide, graphite, carbon coke, mesoporous carbon, polyacene or mixtures thereof. The organic-inorganic hybrids may comprise metal-organic frameworks (MOF), such as zeolitic imidazolate frameworks (ZIFs), $Zn_4O(1,4$-benzenedicarboxylate$)_3$, $Zr_6O_4(OH)_4(1,4$-benzenedicarboxylate$)_6$, $Al(OH)(1,4$-benzenedicarboxylate), $Cu_3(1,3,5$-benzenetriscarboxylate$)_2$, $Cu_2(3,3',5,5'$-biphenyltetracarboxylic acid), $Cu_2(PF_6)(NO_3)(4,4'$-bipyridine$)_4 \cdot 2PF_6 \cdot 32H_2O$; $Cu(1,4$-benzenedicarboxylate) or combinations thereof.

The porous polymers may comprise hyper-crosslinked polymers (HCPs), such as crosslinked polystyrene (PS) and crosslinked polyethylenimine; covalent organic frameworks (COFs); polymers of intrinsic microporosity (PIMs); conjugated polymers, such as polyacetylene (PAC), polyphenylene vinylene (PPV), polyaniline (PANI), polysilane, polytriazine (PTA) and polyphenylene butadiynylene (PPB); fluorinated polymers; polynorbornane (PNB); polyarylene ethynylene; poly(l-trimethylsilyl-1-propyne) (PTMSP); copolymers thereof; or combinations thereof. A preferred porous polymer is melt or solvent processable at elevated temperatures and highly stretchable under the orientation conditions.

Preferred sorbent materials comprise sorbent polymers, $Li_2O$, $CaO$, $ZnO$, $TiO_2$, $ZrO_2$, $SbO_2$, $Al_2O_3$, $AlOx$ ($1 \leq x \leq 3$), $LiOH$, $Ca(OH)_2$, $SiO_2$, $SiOx$ ($1 \leq x \leq 3$), organosilica, mesoporous silicates, montmorillonite, organosilicates, zeolite A, zeolite X, ZSM, ETS, zorite, aerogels, activated carbon, carbon molecular sieve, carbon fiber, carbon nanotube, graphene, graphene oxide, graphite, mesocarbon, zeolitic imidazolate frameworks (ZIFs), Cu-BTC MOFs, hyper-crosslinked polymers (HCPs), covalent organic frameworks (COFs), polymers of intrinsic microporosity (PIMs), conjugated polymers, poly(l-trimethylsilyl-1-propyne) (PTMSP), derivatives thereof, or combinations thereof.

Additives and Compatibilizers

An additive and compatibilizer may be present in one or more layers of the membrane, as taught in great detail in U.S. Pat. Nos. 7,713,636 and 8,142,893. An effective amount of the materials may vary depending upon desired properties of the membrane. Non-limiting examples of the additive include catalysts, cavitating agents, nucleating agents, surfactants, humectants, antioxidants, crosslinking agents, anti-fouling agents, moisture barriers and combinations thereof. The catalysts, e.g., manganese oxide, copper oxide, hopcalite and precious metal, may accelerate an oxidation reaction of contaminants. The cavitating and nucleating agents may further control the pore structure of the membrane. The surfactants and humectants may increase wettability of a fluid onto the film surface.

Suitable antioxidants may include phenolic and phosphite antioxidants, such as pentaerythritol tetrakis[3-(3,5-di-tert-butyl-4-hydroxyphenyl)propanoate]methane, tris(2,4-di-tert-butylphenyl)phosphite, tetrakis(2,4-di-tert-butylphenyl)-4,4'-biphenyldiphosphonite, and combinations thereof. The antioxidants may be used in an amount of about 0.01 to about 5 wt. %, based on the weight of the layer to which it is added.

A compatibilizer is typically used to promote interfacial adhesion between components in blends, layers in structure, or between both. The matrix polymer may be composed essentially of the compatibilizer. Suitable compatibilizers may include polar-modified nonpolar polymers, nonpolar-modified polar polymers, copolymers, thermoplastic elastomers (TPEs), nanofillers and combinations thereof.

Nucleating Agent

The nucleating agent (NA) of this disclosure is capable of creating polymorphs, e.g., α- and β-crystals in PP, or increasing the crystallization site, rate, amount or temperature (Tcc) of the matrix polymer upon cooling from the molten state. The Tcc is commonly termed a cold crystallization temperature; it is measured by differential scanning calorimetry (DSC). The NA can be organic or inorganic, being selected from any nucleator known in the art or made by any convenient means. See, e.g., G. Wypych, *Handbook of Nucleating Agents*, ChemTech, Toronto, 2016. The NA may be added to the matrix polymer at any stage during synthesis or processing via a dry or master batch blend, or by any known or suitable means. A preferred method is to use the master batch.

In one embodiment, one or more matrix polymers of the membrane comprise a NA of about 0.001 to 5, about 5 to 20, about 20 to 40, or about 40 to 60 wt. %; or in the range of about 0.001 to about 60 wt. %, preferably about 0.01 to about 50 wt. %. In certain embodiments, the matrix polymer comprises an organic NA of about 0.001 to about 5 wt. %, preferably about 0.005 to about 3.5 wt. %, and more preferably about 0.01 to about 2 wt. %. In one embodiment, a nucleated matrix polymer has ΔTcc greater about 0, 1, 2, 3, 4, 5 or 10° C.; or in the range of about 0 to about 30, about 0.5 to about 20, or about 1 to about 10° C. The ΔTcc is a difference of Tcc between a nucleated (N) and pristine (P) polymer, i.e., ΔTcc=Tcc (N)–Tcc (P). In certain embodiments, the ΔTcc is negative in the range of about −5 to about 0° C., due presumably without being bound to any theory to the induction time of certain NAs that create simultaneously a large amount of crystal nuclei.

Nonlimiting examples of suitable NAs include inorganic and organic particles; amides; imides; esters of a diol; pigments; nanocrystalline celluloses (NCCs); alkali waxes; alkaline earth metal salts of phosphinates, phosphonates, phosphates, sulfinates, sulfonates, sulfates, hydroxides, and aliphatic and aromatic mono- or polycarboxylates; derivatives thereof; and combinations thereof. A preferred salt may have cations and anions selected from the group consisting of Li, Na, K, Ca, phosphate, sulfate, acetate, propionate, adipate, pimelate, suberate, phthalate, terephthalate, isophthalate, naphthalate, and the like.

In one embodiment, the NA for polar polymers is selected from the group consisting of the sorbent materials, glasses, micas, talcs, kaolinites, clays, wollastonites, $TiO_2$, polyhedral oligomeric silsesquioxane (POSS), NCCs, dibenzylidine sorbitol, carbonates, adipates, Na and Li benzoates, citrates, acetals of sorbitol and xylitiol, ethylene bis-stearamide, disodium bicyclo[2.2.1]heptanedicarboxylate, PEG esters, PEG bis(2-ethylhexanoate), PEG dilaurate, monosodium terephthalates and naphthalates, trisodium phosphate ($Na_3PO_4$), alkyl aryl phosphates, cyclic bis-phenol phosphates, sodium acetate (NaOAc), sodium montanate, sodium and calcium stearates, anthraquinones, perylenes, quinacridones, ionomers of ethylene and ester, polar and nonpolar waxes, rapidly crystallizing or UHMW polymers, liquid crystalline polymers (LCPs), fluoropolymers (FLPs), and combinations thereof. A preferred NA comprises inorganic nanoparticles, benzoates, monosodium terephthalates or naphthalates, disodium bicyclo[2.2.1]heptanedicarboxylate, $Na_3PO_4$, NaOAc, montanates, stearates, ionomers, polybutylene terephthalate (PBT), polybutylene naphthalate (PBN), FLPs, or combinations thereof.

In one embodiment, the NA for PE, the α-crystal of PP or nonpolar polymers is selected from the group consisting of salts of mono- and polycarboxylic acids, e.g., sodium benzoate, aluminum tert-butyl benzoate, disodium bicyclo[2,2,1]heptane-2,3-dicarboxylate and calcium 1,2-cyclohexanedicarboxylate; dibenzylidene sorbitols and derivatives, e.g., 1,3:2,4-dibenzylidene, methyldibenzylidene, ethyldibenzylidene and dimethyldibenzylidene sorbitols, and 1,2,3-trideoxy-4,6:5,7-bis-O-[(4-propylphenyl)methylene]-nonitol; salts of phosphate diesters, e.g., sodium 2,2'-methylenebis (4,6,-di-tert-butylphenyl)-phosphate and aluminum hydroxy-bis[2,2'-methylene-bis(4,6-di-tert-butylphenyl)-phosphate]; benzene trisamides, e.g., N,N',N''-tris-tert-butyl-1,3,5-benzenetricarboxamide and N,N',N''-tris-cyclohexyl-1,3,5-benzenetricarboxamide; vinylalkane and vinylcycloalkane polymers; NCCs; waxes; and combinations thereof.

In one embodiment, the NA for the β-crystal of PP is selected from the group consisting of amide compounds, e.g., dicarboxamides and N,N'-dicyclohexyl-2,6-naphthalene dicarboxyamide; alkali and alkaline earth metal salts of mono-, di- and polycarboxylates comprising potassium 1,2-hydroxystearate, magnesium benzoate, magnesium phthalate, magnesium succinate, calcium salts of pimelic, suberic, phthalic and terephthalic acids, and calcium salts of N-phthaloyl glycine; esters of dibasic and tribasic carboxylic acids; tetraoxaspiro compounds, e.g., 3,9-bis[4-(N-cyclohexylcarbamoyl)phenyl]-2,4,8,10-tetraoxaspiro[5.5]undecane; salts of aromatic sulfonate, e.g., sodium benzenesulfonates and naphthalenesulfonates; pigments, e.g., quinacridones, quinacridones, quinones, dihydroquinacridones and phthalocyanine blues; mixtures of magnesium and cyclic phosphorus compounds; nanosized irons and metal oxides; and combinations thereof.

A β-PP of this disclosure refers to a PP, bio- or petroleum-based, comprising an effective amount of β-NAs. In one embodiment, a β-nucleated layer of the unoriented PP cast sheet comprises a relative amount (Xβ) of β-crystallinity greater than about 20, 30, 40, 50, or 60%; or in the range of about 20 to 100%, preferably about 30 to 100%, more preferably about 40 to 100%, and more preferably about 50 to 100%. The Xβ can be measured with DSC or wide angle X-ray diffraction (WAXS). The β-crystals present in the unoriened sheet undergo a transition during orientation into the α-crystals; thus, leaving behind pores but little or no β-crystal residues in the oriented film. However, the oriented film may yet retain the β-NAs therewithin, exhibiting a β-crystallinity when measured with the second DSC heating scan. The β-NAs may also be removed substantially all out of the membrane during the extraction process. In certain embodiments, the membrane comprises substantially no β-NAs and thus, substantially no β-crystallinity.

In a preferred embodiment, the PP matrix comprises about 0.001 to about 10, about 0.005 to about 5, or about 0.01 to about 3 wt. % of α- or β-crystal NAs. A preferred α-NA may include sodium benzoate, disodium bicyclo[2,2,1]heptane-2,3-dicarboxylate, 1,3:2,4-bis-(3,4-dimethyl-benzylidene) sorbitol, sodium 2,2'-methylenebis-(4,6-di-tert-butyl-phenyl) phosphate, hydroxybis-(2,4,8,10-tetra-tert-butyl-6-hydroxy-12h-dibenzo-(d,g)(1,3,2)-dioxaphosphocin-oxidato) aluminum, 1,2,3-trideoxy-4,6:5,7-bis-O-[(4-propylphenyl) methylene]-nonitol, N,N',N''-tris-tert-butyl-1,3,5-benzenetricarboxamide, or combinations thereof. A preferred β-NA may include N,N'-dicyclohexyl-2,6-naphthalene dicarboxyamide, γ-quinacridones, calcium pimelates, calcium suberates, calcium phthalates, calcium salts of, 3,9-bis[4-(N-cyclohexylcarbamoyl)phenyl]-2,4,8,10-tetraoxaspiro[5.5] undecane, calcium dicarboxylates, nanosized salts of dicarboxylic acids, or combinations thereof.

Diluent

A diluent may also be termed as "process oil", "solvent" or "plasticizer". The diluent may be a solid, a liquid, or combinations thereof. Properties of the diluent, such as chemical structure, polarity, viscosity, boiling point, molecular weight, stability and the like, have an impact on structure and properties of the resultant membrane. The diluent may be compatible with the matrix polymer at elevated temperatures, forming a homogeneous solution and then phase separating upon cooling around the solidification or melting temperature (Tm) of the matrix polymer. At room conditions, however, the diluent can be a good, poor or non-solvent for the matrix polymer. The diluent may preferably be incompatible with the sorbent materials to promote extraction. A preferred diluent is a liquid, characterized by a viscosity at 40° C. of about 500 mm$^2$/s or less (ASTM D 445) and a boiling point of about 400° C. or lower (ASTM D 7169).

Nonpolar polymers may employ a nonpolar diluent. Examples of the nonpolar diluent may include aliphatic, alicyclic or aromatic hydrocarbons, such as nonane, decane, decalin, p-xylene, undecane, dodecane, terpene and the like; mineral oils; mineral oil distillates, such as paraffinic oil, naphthenic oil, aromatic oil and mixtures thereof; waxes; and combinations thereof.

Polar polymers may employ a polar diluent. Non-limiting examples of the polar diluent include renewable oils; ethers, such as diphenyl ether (DPE), polyphenyl ether (PPE), glymes, polyethylene glycol (PEG) and polypropylene glycol (PPG); amides, such as N,N-dimethyl-9-decenamide (DMDA), 1-methyl-2-pyrrolidone (NMP), dimethyl acetamide (DMA), dimethyl formamide (DMF) and tetramethylurea (TMU); amines such as diethanolamine (DEA); alcohols, such as stearyl, oleyl, decyl and nonyl alcohols and glycerine; esters, comprising: triacetin, terephthalates such as bis(2-ethylhexyl) terephthalate (DOTP), adipates such as dioxtyl adipate, phthalates such as dialkyl phthalate (DAP), citrates, such as triethyl citrate and acetyl tributyl citrate (ATBC), organic carbonates and phosphates, such as triethyl phosphate (TEP), trisbutoxyethyl phosphate and trimellitate; ketones, such as benzophenone, cyclohexanone and methyl nonyl ketone; acids, such as decanoic acid and oleic acid; aldehydes; tetramethylene sulfone (TMS); dimethyl sulfoxide (DMSO); derivatives thereof and combinations thereof.

In a preferred embodiment, the diluent is a renewable oil comprising a lipid, selected from the group of vegetable oils, animal oils, fats, waxes and combinations thereof. Non-limiting examples of the renewable oil include soybean oil, corn oil, olive oil, canola oil, rapeseed oil, sunflower oil, castor oil, linseed oil, palm oil, palm kernel oil, coconut oil, safflower oil, peanut oil, cottonseed oil, tall oil, tung oil, babassu oil, hemp oil, fish oil, whale oil, tallow, tallow amine, lard and combinations thereof. Preferred renewable oils comprise coconut oil, palm oil, palm kernel oil, canola oil, olive oil, peanut oil, cottonseed oil, sunflower oil, corn oil, soy bean oil, tallow, lard and combinations thereof.

In a yet preferred embodiment, the renewable oil has an iodine value (IV) of about 150 g $I_2$/100 g or lower and preferably about 100 g $I_2$/100 g or lower, measured according to ASTM D 1959 or AOCS Method Cd1d-92; an oxidation stability index (OSI) of about 5 hours or greater, preferably about 10 hours or greater and more preferably about 15 hours or greater, measured at 110° C. according to AOCS Method Cd12b-92; and/or an oleic content of about 40% or higher and preferably about 50% or higher, based on the fatty acid content of the oil, measured according to AOCS method Ca5a-40. The preferred renewable oil may be prepared from various sources, such as genetically modified organisms, modification of regular renewable oils, renewable resources and combinations thereof. The methods of modifying regular renewable oils may include hydrogenation, epoxidation, catalytic deoxygenation, pyrolysis, electrolysis, hydrotreatment and combinations thereof.

Nonlimiting examples of the preferred renewable oils include genetically modified soybean oils, high oleic soybean oils, hydrogenated soybean oils, genetically modified vegetable oils, high oleic vegetable oils, hydrogenated vegetable oils, epoxidized vegetable oils, high oleic sunflower oils, palm oil, palm kernel oil, castor oil, coconut oil, babassu oil, olive oil, lard, tallow and combinations thereof.

Extractant

The extractant can be a good solvent for the diluent, a poor solvent for the polymer and inert to other components of the layer-forming compositions. The extractant may be a mixture of water soluble and insoluble solvents to facilitate extraction of polar and nonpolar analytes. The extractant may have a low boiling point, a low viscosity, a low surface energy, non-flammability and a low toxicity. The boiling point may be about 250° C. or lower, preferably about 220° C. or lower, and more preferably about 190° C. or lower. The viscosity may be about 0.1 mm$^2$/s or less. The surface tension may be about 100 mN/m at 25° C. or lower, preferably 80 mN/m or lower, and more preferably 75 mN/m or lower. In one embodiment, the extractant has a surface tension of about 10 mN/m or lower.

Non-limiting examples of the extractant include subcritical and supercritical fluids (SCFs) based on $CO_2$, $CHF_3$, $N_2O$, $H_2O$, methane, ethane, propane, ethylene, propylene, butane, isobutane, dimethyl ether, sulphur hexafluoride, ammonia, fluorocarbon, methanol, ethanol and the like; liquid $CO_2$; water; n-propyl bromide (nPB); aqueous alkalines of NaOH, KOH and the like; ionic liquids; N,N-dimethylformamide (DMF); chlorinated hydrocarbons, such as methylene chloride, chloroform, dichloroethylene, trichloroethylene (TCE), perchloroethylene, dichloroethane and trichloroethane; alcohols, such as methanol, ethanol and isopropanol; ketones, such as acetone, n-methyl-2-pyrrolidone and methyl ethyl ketone (MEK); ethers, such as diethyl ether, dimethoxyethane, tetrahydrofuran (THF), dioxane, dioxolane and polyethylene glycol (PEG); esters, such as methyl ester, ethyl acetate and dimethyl carbonate (DMC); 2-methyl tetrahydrofuran (2-MeTHF); methyl siloxane; hydrocarbons, such as pentane, hexane, cyclohexane, heptane, toluene, decane and terpene; halogenated hydrocarbons; halogenated ethers; azeotropes comprising halogenated hydrocarbons, halogenated ethers, hydrofluoroethers and mixtures thereof; derivatives thereof; and combinations thereof.

In some embodiments, the extractant is a chlorinated hydrocarbon selected from the group of methylene chloride, chloroform, dichloroethylene, trichloroethylene (TCE), perchloroethylene, dichloroethane, trichloroethane and combinations thereof. In other embodiments, the diluent is a green solvent selected from the group of dimethyl carbonate (DMC), ethyl acetate, 2-methyl tetrahydrofuran (2-MeTHF), methyl ester, supercritical fluids, derivatives thereof and combinations thereof. In a preferred embodiment, the diluent is subcritical and supercritical fluids (SCFs) comprising $CO_2$. For example, a supercritical $CO_2$ (SC—$CO_2$) is an excellent solvent for nonpolar or small polar molecules owing to its weak polarity. In a yet preferred embodiment, the diluent is a mixture of a SCF and a polar solvent. The polar solvent may preferably comprise water, alcohols, ionic liquids, fluorocarbons, siloxanes and combinations thereof. In a yet preferred embodiment, the diluent is the azeotrope.

Layer Structure and Composition

The multilayer membrane of this disclosure may consist of up to about 100 layers. Each layer may vary in pore structure and function, depending on desired applications. The at least one layer comprises sorbent materials and a plurality of interconnecting pores, both dispersed uniformly throughout the polymeric matrix. The membrane may have a thickness (t) of about 1 µm to about 5 mm. An unoriented membrane can be thick with a t of about 300 µm to about 5 mm. An oriented membrane may be thinner with a t of about 1 µm to about 500 µm. Preferably, the membrane is oriented with increasing sorbability with stretching by up to about 15 times, each in MD and/or TD.

The membrane has a lower density than its layer-forming compositions. In a preferred embodiment, the at least one layer has a porosity ($\phi_P$) of about 5 to about 85%. The membrane may have a porosity ($\phi_P$) of about 1 to about 20%, about 20 to about 35%, about 35 to about 55%, about 55 to about 75%, or about 75 to about 90%. The interconnecting pores may have an average diameter of about 0.01 nm to about 50 µm, preferably about 0.1 nm to about 30 µm, more preferably about 1 nm to about 20 µm, more preferably about 1 nm to about 10 µm and even more preferably about 1 nm to about 5 µm.

In a yet preferred embodiment, the at least one layer contains the sorbent materials of about 5 to about 100 wt. %. The at least one layer may contain the sorbent materials of ≥about 10 wt. %, preferably ≥about 20 wt. %, more preferably ≥about 30 wt. %, more preferably ≥about 40 wt. %, more preferably ≥about 50 wt. %, more preferably ≥about 60 wt. %, more preferably ≥about 70 wt. %, more preferably ≥about 80 wt. %, more preferably ≥about 90 wt. % and even more preferably 100 wt. %. Although not particularly restricted, the at least one layer may contain the sorbent materials of about 0.1 to about 5 wt. %. The membrane may comprise the sorbent materials ≤100 wt. %.

In a yet preferred embodiment, the sorbent materials present in the at least one layer retain their initial sorbability, porosity, and/or activity ($R_{SBT}$) of about 50 to 100%. The at least one layer may have a $R_{SBT}$ of ≥about 40%, preferably ≥about 50%, more preferably ≥about 60%, more preferably ≥about 70%, more preferably ≥about 80%, more preferably ≥about 90% and even more preferably 100%.

Figure 2:
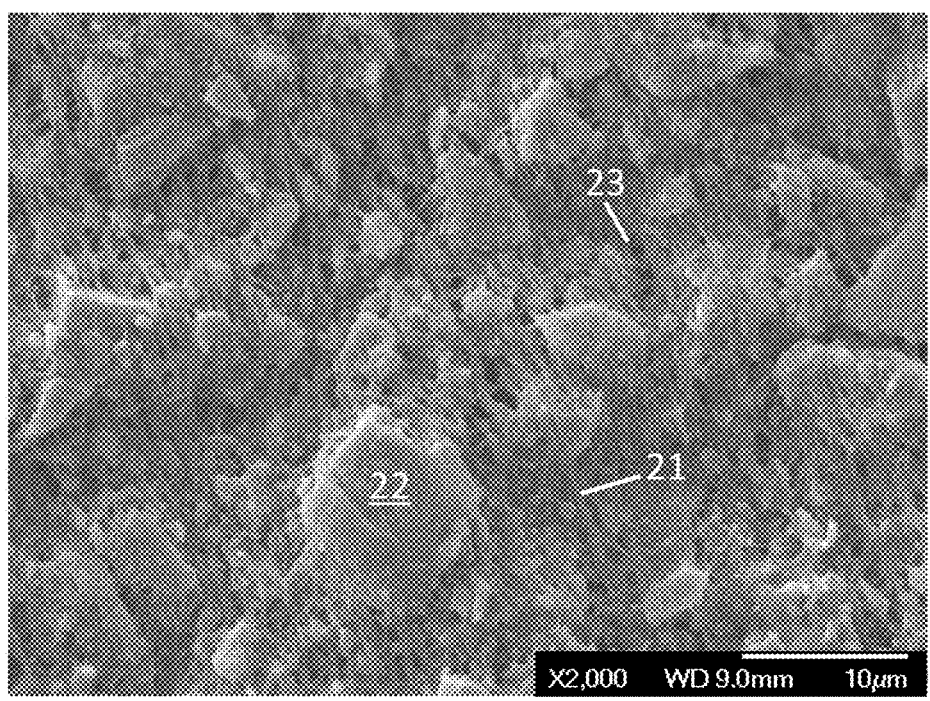
FIG. 2 is a micrograph of scanning electron microscope (SEM) taken at a magnification of 2,000× for a typical surface of a multilayer sorbent membrane of the present disclosure.

FIG. 1a shows an example of a two-layer membrane of this disclosure, consisting of a first layer 11 and a second layer 12 disposed on a side of the first layer 11. FIG. 1b shows an example of a three-layer membrane, further comprising a third layer 13 disposed on a side of the first layer 11 opposite the second layer 12. FIG. 1c shows an example of a five-layer membrane, further comprising a fourth layer 14 disposed on a side of the second layer 12 and a fifth layer 15 disposed on a side of the third layer 13 opposite the fourth layer 14. The membrane may consist of four layers, comprising layers 11, 12, 13 and 14. FIG. 2 shows a typical surface image of a membrane of this disclosure. The membrane contains a finely dispersed co-continuous multiphase morphology, characterized by a fibrous matrix 21, a dispersed filler 22, and an interconnecting pore 23.

The innermost layer 11 is often termed as a core layer. The core layer is to serve as a monolayer membrane or to provide the foundation of the multilayer structure. In one embodiment, the core layer is the at least one layer and has a thickness (t) of about 10 to about 100% of the total film thickness. The core layer may provide the membrane with a variety of other advantageous functions. The layer may be permeable and/or conductive to selective species, wettable, adhesive, printable, or sealable. The core layer may support adjacent layers, separate substrates, store species, insulate current, or provide barrier against permeating molecules.

The intermediate layer, e.g., layer 12 or 13 of the 5-layer membrane, is often termed as a tie layer. The tie layer is to bond adjacent layers together. In one embodiment, the intermediate layer is highly sorptive, porous and connects adhesively two adjacent layers. The layer may have a thickness (t) of ≤about 5 µm, ≤about 10 µm, ≤about 50 µm, or about 0.01 to about 70% of the total film thickness. The two intermediate layers may be symmetric. In other embodiments, the intermediate layer comprises at least one compatibilizer. The intermediate layer may also provide transition between layers, yield elastically, seal defects of the adjacent layers, or dissipate the applied stress.

The outermost layer, e.g., layer 12 or 13 of the 3-layer membrane and layer 14 or 15 of the 5-layer membrane, is often termed as a skin layer. The skin layer is to provide a desired function to the membrane. The two skins may be asymmetric. In one embodiment, the skin layer is highly porous with a porosity ($\phi_P$) ≥30%. The layer may have a t of ≤about 1 nm, ≤about 1 µm, ≤about 10 µm, ≤about 50 µm, ≤about 100 µm, or about 0.01 to about 70% of the total film thickness. The layer may be highly permselective and/or highly sorptive toward permeating species, adhesive, printable, sealable, wettable, or conductive to current and ions. The skin layer may also provide a diffusion pathway for or barrier against substances to be sorbed, support the core layer, or protect the multilayer structure.

In a preferred embodiment, the membrane consists of at least two layers. The layers may consist of the same materials at different compositions. The layers may differ in component materials. The core layer may comprise at least one polyolefin polymer. At least one layer may comprise a polar polymer, a sorbent polymer, a miscible polymer blend, an immiscible polymer blend, a compatibilizer or any combination thereof. At least one layer may comprise adsorbent materials, absorbent materials or combinations thereof. At least one layer may comprise mesoporous sorbents. At least one layer may be substantially nonsorbent and/or substantially nonporous.

Process of Membrane Manufacture

Figure 3:
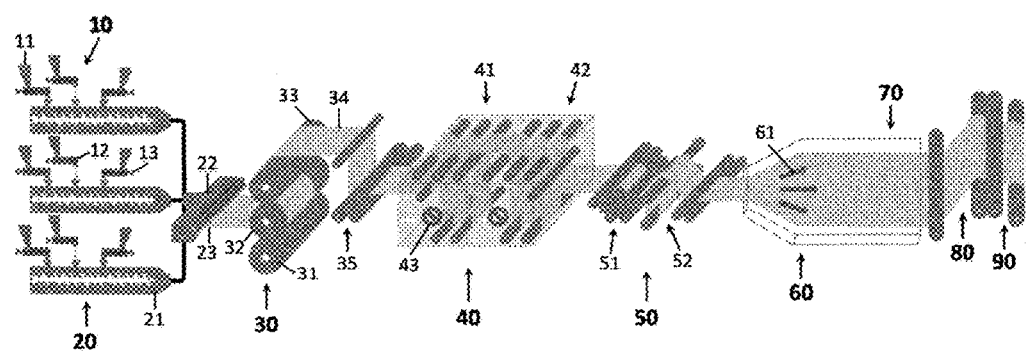
FIG. 3 is a schematic illustration of a continuous single-step multilayer coextrusion film process in accordance with some embodiments of the present disclosure.

FIG. 3 illustrates an example of a continuous single-step coextrusion film process of this invention, comprising: a feeding system 10, a coextrusion process 20, a casting unit 30, an extractor 40, orienters 50 and 60, and a dryer 70. The coextrusion process consists of three extruders 21, i.e., one main and two satellite extruders. A dried membrane may be calendered or stretched further at least in one direction 80, wound 90 and then, slit into a desirable dimension. At least one unit of the continuous process can run in a batch or semi-continuous manner. The manufacturing process may further comprise in-line, although not shown in FIG. 3, surface treaters, coaters, laminators, thin film deposition processes and the like, as taught in U.S. Pat. Nos. 7,713,636, 8,142,893 and 8,557,919.

Feeding of Raw Materials: Prior to being fed into extruders 21, hygroscopic raw materials can be dried to a moisture level ≤50 ppm. The raw materials may be pre-blended in groups or all together, and then fed into the extruders with feeders 11-13. The raw materials may preferably be metered into the extruders, each separately and without pre-blending. Solid feedstocks may be metered into the extruders via a main feeder 11, and liquid feedstocks can be pre-heated and then injected downstream via a second feed 12, a third feeder 13, or both.

Coextrusion: The feedstock materials fed are dissolved at elevated temperatures and mixed homogeneously within each extruder. The homogeneous melt is then conveyed to a film-forming die 22 through a multilayer feedblock, to form a multilayer coextrudate. Extrusion conditions are set in a way of ensuring a homogeneous mixing of the fed materials, while not to cause excessive degradation of any component. A monolithic or monolayer extrudate can be produced with a single extruder or by coextruding the same composition with multiple extruders. A multilayer structure is constructed through coextrusion or coextrusion plus in-line coating. The in-line coating may be carried out by any convenient method known in the art, such as roll coating, gravure coating, die coating, extrusion coating and the like. Alternatively, the layer-forming compositions may be first compounded into masterbatches, which are then re-extruded to form a multilayer coextrudate.

The extruders may be a single or multiple screw extruder having multiple feed ports downstream along the machine. A twin screw extruder is preferred, having a length (L) to diameter (D) ratio (L/D) of about 15 to about 65 and preferably about 25 to about 55. The twin screws may rotate in a co- or counter-direction, and preferably have a series of intense mixing and kneading sections. The coextrusion process may employ a tandem extruder, consisting of single and/or twin screw extruders. Preferably, the coextrusion process yields a homogeneously mixed melt within a short residence time at a high output rate.

Film Cooling: A coextrudate 23 issuing out of the film-forming die is cast onto a cast roll 32 to form a multilayer sheet 34. The cast roll temperature is set to be chill, generally ≤60° C., to cool or solidify the coextrudate. For rapid quenching or coagulation, the casting process 30 may employ an air knife, a water bath, a series of rolls, any additional cooling means, or combinations thereof. The design of the quenching system may depend on compositions of the coextrudate, process conditions, and target profiles. A sufficiently low roll temperature can produce an asymmetrically structured film, i.e., a denser roll-side skin than the opposite air-side skin. A high roll temperature, on the other hand, may result in a reversed structure, i.e., a denser air-side skin than the roll-side surface. In a preferred embodiment, the roll temperature is sufficiently low enough to produce an asymmetric sheet.

The casting process may employ a series of roll stacks, to calender the sheet to a target thickness and/or to emboss a flow channel pattern such as a rib onto one or both surfaces of the sheet. A calender or embossing stack 35 that consists of a series of rolls may be installed separately after the casting unit 31-33. The cast sheet may be calendered, alternatively or additionally, after extraction 40 or MD orientation 52, or prior to winding 80 at temperatures around or below the crystalline melting point (Tm) of the matrix polymer. Calendering is to decrease the porosity of the resulting film, while increasing the connectivity and density of the disperse phase. The calender rolls are typically configured to have a gap decreasing with each successive pass.

The flow channel pattern may be embossed along the machine direction (MD) or at any suitable angle to the MD. The pattern can be linear and/or curved. In some embodiments, the pattern is a rib which, when the film is stacked or wound together, forms an internal flow channel from one to the other end of the rolled web. The flow channels may have a depth ≥about 50% of the film thickness and a width to depth ratio ≥0.5. In other embodiments, the film is calendered without any flow pattern. In certain embodiments, the cast sheet is neither calendered nor embossed.

Diluent Extraction: The diluent is extracted at temperatures ≤Tm of the matrix polymer, by passing the film around a series of rolls located inside a washing 41 and rinsing stage 42 of the extractor 40. The extractor 40 is filled with an extractant. Any prior art method used for non-sorbent films may be employed, e.g., evaporation, dipping, countercurrent flow, showering, washing and combinations thereof. The used extractant may be recycled similarly to those disclosed in U.S. Pat. Nos. 4,648,417 and 5,772,935. In some embodiments, the extractor 40 is a countercurrent flow apparatus, comparted into sections into which a fresh extractant enters counter to the machine direction (MD). The extractor 40 is equipped with a washing and rinsing stage that can strip off the diluent from the film surface. The extracted film, without orientation, can be dried and wound into a web.

In a preferred embodiment, the extractor 40 is equipped with an ultrasonic extraction unit (USE) comprising a high-power sonicator 43. The sonicator produces an ultrasonic frequency of about 10 kHz to about 1 GHz and preferably about 20 kHz to about 20 MHz. The sonic horn 43 may employ a piezoelectrically activated ultrasonic transducer, located on the top area of the extractor 40. In another preferred embodiment, the extractor 40 is a supercritical fluid extractor (SFE) that runs around or beyond the supercritical conditions of the extractant. For example, a carbon dioxide ($CO_2$) extractant may run around or above its supercritical conditions, i.e., 31.3° C. and 7.38 MPa, in which $CO_2$ is in a subcritical, supercritical, or liquid state. In a yet preferred embodiment, the extractor 40 is equipped with both USE and SFE and employs a supercritical $CO_2$ extractant. In a yet preferred embodiment, the extraction is carried out by a batch or semi-continuous manner that enables a substantial increase of the film line speed. The batch or semi-continuous extractor may be equipped with USE, SFE, or both.

Film Stretching: Orientation 50-60 of the film is optional but preferred. The cast sheet may be stretched at least in one direction before or after extraction 40. In one embodiment, the sheet is uniaxially oriented in the machine direction (MD) with a series of rolls 51-52 or in the transverse direction (TD) with a tenter frame 60-61. In another embodiment, the sheet is biaxially oriented. The cast sheet may be stretched first in the MD 52 and subsequently in the TD 61. The sheet may also be stretched simultaneously 60 both in the MD and TD. The oriented film can be calendered and/or stretched further 80 in one or more directions. The film is then wound 90 and slit into a desired dimension. In a preferred embodiment, the sheet is simultaneously biaxially oriented after the extraction and then further oriented uniaxially in the TD.

The uniaxial orientation in MD or TD can be conducted at a stretch ratio ≤about 15 and temperatures between around the glass transition temperature (Tg) and around the flow or crystalline melting temperature (Tm) of the matrix polymer. The biaxial conditions are similar to the uniaxial ones. The tenter frame may consist of 5 sections: a preheating zone, a stretching zone, a cooling zone, an annealing zone, and a drying zone. The orientation may spread the particle inclusions across the plane of the film, but yet the inclusions retain close proximity ensuring desired properties. Preferably, the orientation is to increase or cause little change in sorbability of the film. The orientation may be carried out, following the procedures described in U.S. Pat. No. 8,142, 893. Preferred orientation processes may include a blown process, a double bubble process, a uniaxial roll process, a biaxial tenter frame process, and combinations thereof.

Extractant Removal: The extracted film can be dried by passing it through a forced air dryer. Although not shown in FIG. 3, the air dryer may be located immediately after the extractor 40. The drying can remove substantially all residual diluents and extractants. The drying may be carried out, alternatively or additionally, using part 70 of the tenter frame. The drying temperature can be set to around or below Tm of the matrix polymer. For multicomponent systems, the drying temperature may be determined by the lower Tm of the component polymers or the Tm of the major component. The dried film, i.e., the membrane, may be re-dried or activated prior to use.

In some embodiments, the membrane contains substantially no residual diluents and extractants. The residual diluent may be present in the membrane in an amount of ≤about 3.0 wt. %, preferably ≤about 1.0 wt. %, more preferably ≤about 0.1 wt. %, even more preferably ≤about 0.01 wt. %, and the most preferably ≤about 0.001 wt. %. In other embodiments, the membrane retains about 3 to about 25 wt. % of the residual diluent. The membrane may contain a residual extractant of ≤about 10 ppm, preferably ≤about 1 ppm, more preferably ≤about 0.1 ppm, even more preferably ≤about 0.01 ppm, and the most preferably ≤0.001 ppm. The content of the residual solvent can be determined according to EPA Method 8260 B.

Additional Processes: At least a portion of one or both of the outer surfaces of the membrane may be treated at any stage during manufacture, to provide surfaces with chemical species or high energy for crosslinking, coating, lamination, printing, deposition and the like. The surface treatment may be carried out according to any method known in the art, such as corona discharge, plain and polarized flame treatment, plasma treatment, chemical treatment, radiation treatment, and combinations thereof.

At least a portion of one or both outer surfaces of the membrane may be coated once or more with at least one primer and/or at least one polymer, as described in U.S. Pat. Nos. 3,753,769, 4,058,645, 4,439,493, and 7,713,636. The coating may provide a desired function, such as permselectivity, absorption, adsorption, separation, permeation, wettability, conductivity, adhesion, sealability, printability, protection, barrier, transition, or combinations thereof. The coating may be applied with any convenient manner known in the art, such as roll coating, gravure coating, die coating, extrusion coating, spraying, dipping, solution casting, deposition and combinations thereof. The applied coating may be dried by hot air, radiant heat, or any other convenient means. In a preferred embodiment, the film is in-line coated and the coating is crosslinked during any stage between the casting 30 and winding 90 processes.

The coatings may have a thickness of about 0.01 nm to about 20 µm, preferably about 0.1 nm to about 10 µm, and more preferably about 1 nm to about 1 µm. In some embodiments, the coatings have a thickness of about 0.1 to about 10 nm. Preferred coatings may comprise one or more sorbent materials of about 0.01 to about 100 wt. %, preferably about 0.1 to about 95 wt. % and more preferably about 1 to about 90 wt. %, based on the weight of the dried coating. In other embodiments, the coatings consist essentially of sorbent materials, sorbent polymers, or combinations thereof. In a preferred embodiment, the coatings comprise nanoscale sorbent materials of about 0.1 nm to about 1,000 nm in size.

EXAMPLES

Membranes of the present invention are further described with reference to the following non-limiting examples. The properties of the examples are measured according to the following test methods.

Test Method

Particle Properties: Mastersizer 3000 of Malvern Instrument was used to measure an average particle size and a particle size distribution of the sorbent materials. Before and after processing, the adsorbent materials were characterized with a nitrogen adsorption porosimetry (Micromeritics ASAP 2020) (ASTM D6556) for a pore volume ($\phi_S$), a pore size distribution (PSD) and a Brunauer-Emmett-Teller (BET) surface area ($A_{BET}$). The gas volume adsorbed at various vapor pressures was recorded for the adsorption and desorption steps. Recovery ($R_{SBT}$, %) of the initial porosity for the materials was then calculated:

$$R_{SBT} = \frac{\text{Measured Porosity of Particles in the Dried Membrane}}{\text{Initial Porosity of Particles}} \times 100$$

For the absorbent materials, the $R_{BST}$ was calculated in a similar way by weighing the samples, before and after immersing them for 24 hr into water or hydrocarbon. During the measurement, the wettability of the samples was also examined with these polar and nonpolar liquids. In general, the $R_{BST}$ value was correlated proportionally to changes in sorbability of the materials.

Thickness (t, µm): The average thickness of the membrane was measured by a caliper and a dial gauge thickness meter at 1 cm interval along the MD and TD of a 10 cm×10 cm specimen. Five measurements on each membrane sample were averaged. The dial gauge thickness meter had a resolution of about 1 µm with a maximum reading error ≤3 µm. An optical microscopy was also used to measure the overall and layer thicknesses of the membranes.

Porosity ($\phi_P$, %): The membrane porosity was measured by measuring the specimen density: $\phi_P = 100 \times (d_O - d_M)/d_O$, wherein $d_M$ and $d_O$ are respectively the measured and calculated density. The specimen density was measured by measuring the specimen yield and volume. Yield is the measure of the specimen coverage per unit weight, measured according to ASTM D-4321. The size and volume of the interconnecting pores were also measured according to the mercury intrusion method.

Tensile Properties: Tensile tests were performed in the MD and TD with an Instron 4400 machine in accordance with ASTM D882. An average of five measurements on each sample was reported.

Shrinkage Ratio (%): The heat shrinkage ratios in the MD and TD were measured after exposing the membrane at 105° C. for 8 hours in an oven. An averaged value of three measurements was used.

Air Permeability ($N_G$, s/100 cm$^3$/25 μm): The air permeability of the membrane was measured according to ASTM D726. The Gurley number ($N_G$) is a time required for a specific amount of air to pass through a specific area of the specimen under pressure. When the porosity and thickness of the specimen are fixed, the $N_G$ is then to measure the tortuosity of a porous structure. A pressure drop (ΔP) along the cross-flow unit of a spiral wound membrane module was measured using the air of 5.5 MPa and 50° C. The measured ΔP was scaled from 1 to 5. The lower the scale, the lower the ΔP.

Phase Morphology: The micrographic images of scanning electron microscopy (SEM) were taken with Jeol JSM 6400. Fresh cross-section surfaces were prepared by freeze fracturing the specimen perpendicular and parallel to MD at −130° C. using liquid nitrogen. The fresh surfaces were subsequently coated with platinum, and images were then taken at an acceleration voltage of 25 KV. The SEM images were also used to measure the size, thickness or dimension of the continuous and disperse phases, including particles, aggregates, fibrils, platelets, tubes, and etc.

Peel Strength ($\sigma_P$, g/cm): A 12 μm poly(ethylene terephthalate) (PET) film was laminated onto the skin layer of the membrane specimen with Dow 522 A&B adhesive. The coat weight of the adhesive was about 0.84 kg/ream. Both sides of the laminated specimen were then supported by taping with 3M Scotch™ 610 tape. The taped specimen was cut to about 2.54 cm wide by about 12.7 cm long along the machine direction. The peel strength was then measured at the 90° mode at room conditions with an Instron machine (Sintech 1, MTS System Corporation). A delaminating specimen generally has $\sigma_P \leq 50$ g/cm.

Feedstock Materials

The materials used in Examples and Comparative Examples were all commercially available products. TABLE 1 lists the physical properties of the matrix polymers, such as melt flow index (MFI), intrinsic viscosity (IV, g/dl), weight average molecular weight (Mw), molecular weight distribution (MWD), density (ρ) and crystalline melting temperature (Tm). In case of multi-melting polymers, the listed Tm represents the highest crystalline melting point. The polymers were petro- and bio-based, including ultrahigh molecular weight polyethylene (UPE), high density polyethylene (HDPE), isotactic polypropylene (PP), β-nucleated PP (β-PP), ultrahigh molecular weight PP (UPP), ultrahigh molecular weight β-PP (β-UPP), polyimide 66 (PA66), poly(ethylene terephthalate) (PET), poly(vinylidene fluoride) (PVDF) with a melt viscosity of 50 kPs at 100 s$^{-1}$ and 232° C., PVDF copolymer with hexafluoropropylene (PVdF-HFP), and 16/84% ethylene/propylene thermoplastic elastomer (TPE) and its maleated grade (m-TPE). Each polyolefin comprised about 0.1 wt. % antioxidant. Unless specified otherwise, the matrix polymers were petro-based and the mixtures were all 70/30 wt. % blends.

TABLE 2 shows the physical properties of the sorbent materials, such as average particle size ($D_{50}$), porosity ($\phi_S$), BET specific area ($A_{BET}$) and bulk density ($\rho_B$). The materials used included: powdered activated carbon (PAC), mesoporous PAC (m-PAC), calcium hydroxide Ca(OH)$_2$, mesoporous silica MCM-41, zeolite 4A, mesoporous zeolite (ZSM-5), carbon nanofiber (CNF), aminosilane-treated zeolite 13X, oxidized graphene (GRP), lithium hydroxide (LiOH), metal organic framework of Cu$_3$(BTC)$_2$ (HKUST-1), zeolitic imidazole framework of 2-methylimidazole zinc salt (ZIF-8), polybenzodioxane (PIM-1) and nanosilica (SiO$_2$). Both Ca(OH)$_2$ and LiOH were anhydrous with moisture ≤0.5 wt. %. The sorbent mixtures were all 60/40 wt. % blends, unless specified otherwise.

The diluents used included nonpolar and polar solvents, i.e., paraffin wax (PW), liquid paraffin (LP), diphenyl ether (DPE), dibutyl phthalate (DBP), and vegetable oil (VTO). The VTO was a genetically modified high oleic soybean oil having an oleic content ≥80% and an oxidation stability index (OSI) ≥60 hours. The extractants were pentane (PTN), hexane (HXN), trichloroethylene (TCE), an azeotrope (AZ) of 70/20/10 wt. % trans-1,2-dichloroethylene/decafluoropentane/heptafluorocyclopentane, dimethyl carbonate (DMC), and supercritical CO$_2$ fluid (SC—CO$_2$).

TABLE 1

| Polymer | MFI (g/10 m) | Mw (10$^5$ g/m) | MWD (Mw/Mn) | ρ (g/cc) | Tm (° C.) |
|---|---|---|---|---|---|
| UPE | / | 30 | / | 0.94 | 135 |
| HDPE | 0.1 | 7 | 5.2 | 0.96 | 130 |
| PP | 1.5 | 5 | 5.5 | 0.9 | 160 |
| β-PP | | | | | |
| UPP | / | 30 | 6.5 | 0.9 | 165 |
| β-UPP | | | | | |
| PA66 | / | 2 | / | 1.14 | 250 |
| PET | 0.85 (IV) | / | / | 1.27 | 240 |
| PVDF | 0.1 | / | / | 1.78 | 170 |
| PVdF-HFP | 0.1 | / | / | 1.78 | 170 |
| TPE | 8 | 0.7 | 2.1 | 0.862 | 95 |
| m-TPE | | | | | |

TABLE 2

| Sorbent | $D_{50}$ (nm) | $\phi_S$ (cc/g) | $A_{BET}$ (m$^2$/g) | $\rho_B$ (g/cc) |
|---|---|---|---|---|
| PAC | 12 × 10$^3$ | 1.5 | 1450 | 0.55 |
| m-PAC | 12 × 10$^3$ | 1.5 | 1450 | 0.55 |
| Ca(OH)$_2$ | 13 × 10$^3$ | / | / | 0.56 |
| MCM-41 | 300 | 1.3 | 1270 | 0.35 |
| Zeolite 4A | 3.5 × 10$^3$ | 0.7 | 750 | 0.61 |
| ZSM-5 | 300 | 0.8 | 450 | 0.72 |
| CNF | 125 | 0.15 | 100 | 0.06 |
| Zeolite 13X | 3.5 × 10$^3$ | 0.7 | 750 | 0.55 |
| GRP | 10 | 2.5 | 1010 | 0.51 |
| LiOH | 13 × 10$^3$ | / | / | 0.79 |
| HKUST-1 | 16 × 10$^3$ | 1.3 | 2100 | 0.35 |
| ZIF-8 | 500 | 0.65 | 1800 | 0.33 |
| PIM-1 | 500 | 1.1 | 900 | / |
| SiO$_2$ | 30 | / | 50 | 0.41 |

Film Processing

The coextrusion film line, shown in FIG. 3, equipped with three twin screw extruders was used. The main extruder had a screw diameter of 25 mm and an L/D of 40. The satellite extruders had a 16 mm screw of 35 L/D. The processing conditions were optimized for each composition, according to properties of the feedstock materials. Prior to extrusion, all hydrophilic solid feedstocks were dried for about 5 hrs at temperatures of 50 to 250° C. to moisture level ≤50 ppm. The extruders ran at the range of 150 to 350° C., 100 to 1,000 rpm, and a total output of 5 to 30 Kg/hr.

Some powder feedstocks were pre-blended with a tumbler mixer. The components were then metered into the extruder with the main feeder. The diluent was heated to about 150° C. and injected into the extruder downstream via the second feed port located prior to the first kneading section. Extrudates issuing out of a 6 inch wide film-forming die were quenched into a sheet using a chill roll set to 10 to 100° C.

For selected examples, a rib pattern of an isosceles trapezoid was embossed with a patterned roll on one surface of the cast sheet. The isosceles trapezoid had a dimension, based on the sheet thickness, of an upper base length of 60%, a bottom base length of 125% and a height of 50%. The pattern was aligned in the TD at an interval 200% of the sheet thickness.

The cast sheet was unoriented or oriented at temperatures of 100 to 300° C., and then extracted at temperatures of 30 to 100° C. or under the $CO_2$ supercritical condition. For selected samples, the extraction was assisted by a high-power sonicator (S) running at 50 kHz. The extraction and/or calendaring were done, respectively prior to or after orientation. The supercritical fluid extraction (SFE) was also carried out in a batch mode as follows: i) a 20×20 cm diluent-laden film was placed in a 1.5-liter vertical stirred high-pressure vessel, which subsequently was charged with 700 ml SC—$CO_2$ at 50° C. and 10 MPa; and then ii) the sample was extracted twice, each for 30 min under 20 kHz ultrasound; and then dried for 30 min in a hot air oven at 100 to 200° C.

Examples C1-C3 and 1-10

TABLE 3 shows the layer structure, composition, and process conditions of Comparative Examples C1-C3 and Examples (EX) 1-10. Except for a soda lime Ca(OH)$_2$ of C2, the sorbent materials used were carbons and zeolites. C1-C3 were prepared according to the conventional methods, a monolayer membrane with a very high and a very low polymer content. A rib pattern was embossed on C2 film. C1 film was stable, splitting infrequently during processing. However, C2 and C3 films were too brittle for a continuous operation, along with fractions of the particle inclusions falling out of the matrices. In contrast, EXs 1-10 were a multilayer film, all asymmetric in composition and/or structure. The Example films contained at least one layer containing a low polymer content ≤2.5 wt. %, similar to C2 and C3 films. Surprisingly, however, all the Example films were stable with little or no instability and splits.

EX 1 had a skin layer identical in composition to C3, i.e., a highly sorbent skin, but the core layer had a higher polymer content. EXs 2-3 contained a UPE or UPP matrix, with a rib pattern embossed on one surface. EX 2 was extracted under ultrasound (S). EX 4 was a 3-layer film, composed of a UPE/UPP blend and MCM-41. The skin layer had a large amount 80 wt. % of the incompatible diluent with MCM-41. EXs 5-6 were composed of PP blends, oriented biaxially by 3×3; but, their layers differed, within ≤8 wt. %, in polymer content. EXs 7-10 had all a bio-based polyolefin matrix, unoriented or oriented, which exhibited a better stability presumably owing to carbon nanofiber (CNF) and β-UPP used in the films. EXs 5-10 employed "green" extractants. EXs 9-10 were made all with bio-based renewable feedstocks.

TABLE 4 shows the experimental results of the Example membranes, i.e., composition, thickness (t), recovery ($R_{SBT}$) of the sorbent porosity, porosity ($\phi_P$) of the films and film layers, Gurley number ($N_G$) and pressure drop (ΔP). Equally biaxially stretched membranes had similar tensile properties in MD and TD. Although C1 membrane had a low tensile strength, it was ductile but tended to elongate during processing. This was found due to its high PP content. C2-C3 membranes were substantially brittle with a low tensile strength (STR)≤0.1 MPa. Overall, C1-C3 membranes were also poor in other properties, such as a high $N_G$, a large ΔP, and a high shrinkage ratio.

TABLE 3

| | | Composition | | | | | Orientation | |
|---|---|---|---|---|---|---|---|---|
| | | Polymer | Sorbent | Diluent | P/S/D | | | | |
| EX | Layer | (P) | (S) | (D) | (wt %) | Rib | Extract | MDX | TDX |
| C1 | Mono | PP | PAC | PW | 58/17/25 | X | PTN | / | / |
| C2 | | UPE | Ca(OH)$_2$ | LP | 1/49/50 | O | HXN | / | / |
| C3 | | UPE | PAC | LP | 1/39/60 | X | TCE | / | / |
| 1 | Skin | UPE | PAC | LP | 1/39/60 | X | TCE | / | / |
| | Core | | | | 4/36/60 | | | | |
| 2 | Skin | UPE | PAC | LP | 2/38/60 | O | TCE/S | / | / |
| | Core | UPE/HDPE | | | 4/36/60 | | | | |
| 3 | Skin | UPP | ZSM-5 | DPE | 4/36/60 | O | TCE | / | / |
| | Core | | | | 2.5/47.5/50 | | | | |
| 4 | Skin | UPP/UPE | MCM-41 | DBP | 1/19/80 | X | TCE/S | / | / |
| | Core | | | | 4/36/60 | | | | |
| | Skin | | | | 1/19/80 | | | | |
| 5 | Skin | UPP/PP | 4A | DBP | 1.5/27.5/70 | X | AZ | 3 | 3 |
| | Core | | | | 8/32/60 | | | | |
| | Skin | | | | 1.5/27.5/70 | | | | |
| 6 | Skin | UPP/β-PP | PAC | DBP | 2.5/47.5/50 | X | AZ/S | 3 | 3 |
| | Core | | | | 5/45/50 | | | | |
| | Skin | | | | 2.5/47.5/50 | | | | |
| 7 | Skin | UPP | 13X/CNF | LP | 2.5/47.5/50 | X | DMC | / | / |
| | Core | | | | 5/45/50 | | | | |
| 8 | Skin | β-UPP | PAC/CNF | LP | 2.5/47.5/50 | X | DMC/S | 3 | / |
| | Core | | | | 5/45/50 | | | | |
| 9 | Skin | UPE | 13X/GRP | VTO | 2.5/47.5/50 | X | SC—$CO_2$ | 3 | 3 |
| | Core | | | | 6/34/60 | | | | |
| 10 | Skin | UPE/PE | PAC/GRP | VTO | 2.5/47.5/50 | X | SC—$CO_2$/S | 3 | 3 |
| | Core | | | | 6/34/60 | | | | |
| | Skin | | | | 2.5/47.5/50 | | | | |

TABLE 4

| EX | Layer | Membrane P/S (wt %) | t (μm) | Tensile (MD) STR (MPa) | Tensile (MD) STN (%) | Porosity (%) $R_{SBT}$ | Porosity (%) Film ($\phi_P$) | Shrinkage MD (%) | Shrinkage TD (%) | Gurley (s) | ΔP |
|---|---|---|---|---|---|---|---|---|---|---|---|
| C1 | Mono | 77/23 | 500 | 1.1 | 12 | <10 | 45 | 6.1 | 4.5 | 153 | 5 |
| C2 | | 2/98 | 500 | <0.1 | <5 | <10 | 56 | 4.3 | 3.4 | 121 | 3 |
| C3 | | 2.5/97.5 | 500 | <0.1 | <5 | 65 | 56 | 4.3 | 3.4 | 121 | 4 |
| 1 | Skin | 2.5/97.5 | 200 | 12.3 | 17 | 85 | 19 | 1.2 | 1.2 | 95 | 3 |
| | Core | 10/90 | 300 | | | | 17 | | | | |
| 2 | Skin | 5/95 | 300 | 16.5 | 21 | 98 | 18 | 1.1 | 1.3 | 78 | 1 |
| | Core | 10/90 | 500 | | | | 19 | | | | |
| 3 | Skin | 10/90 | 300 | 15.3 | 19 | 90 | 18 | <1 | <1 | 83 | 1 |
| | Core | 5/95 | 500 | | | | 15 | | | | |
| 4 | Skin | 5/95 | 50 | 19.5 | 25 | 99 | 56 | <1 | <1 | 77 | 1 |
| | Core | 10/90 | 100 | | | | 10 | | | | |
| | Skin | 5/95 | 50 | | | | 57 | | | | |
| 5 | Skin | 5/95 | 50 | 75.2 | 42 | 90 | 51 | <1 | <1 | 65 | 1 |
| | Core | 20/80 | 100 | | | | 15 | | | | |
| | Skin | 5/95 | 50 | | | | 52 | | | | |
| 6 | Skin | 5/95 | 50 | 78.6 | 33 | 100 | 17 | <1 | <1 | 93 | 3 |
| | Core | 15/85 | 100 | | | | 15 | | | | |
| | Skin | 5/95 | 50 | | | | 19 | | | | |
| 7 | Skin | 5/95 | 50 | 26.5 | 18 | 86 | 18 | <1 | <1 | 57 | 3 |
| | Core | 10/90 | 100 | | | | | | | | |
| 8 | Skin | 5/95 | 35 | 92.5 | 45 | 100 | 17 | <1 | <1 | 76 | 3 |
| | Core | 10/90 | 65 | | | | 15 | | | | |
| 9 | Skin | 5/95 | 35 | 87.5 | 43 | 92 | 14 | <1 | <1 | 88 | 3 |
| | Core | 15/85 | 65 | | | | 17 | | | | |
| 10 | Skin | 5/95 | 25 | 85.2 | 51 | 100 | 15 | <1 | <1 | 61 | 3 |
| | Core | 15/85 | 50 | | | | 19 | | | | |
| | Skin | 5/95 | 25 | | | | 16 | | | | |

In contrast, EXs 1-10 membranes all had an asymmetric pore structure along with superior tensile properties, i.e., stress (STR) at break ≥10 MPa and strain (STN) at break ≥15%. The oriented membranes were thin t≤100 μm, with significantly further improved tensile strengths. The PP matrix was found the most stable, producing consistently a uniformly thin gaged membrane. EXs 2-3 membranes were thick t=800 μm, with an embossed rib pattern resulting in a low ΔP in the cross-flow test. Surprisingly, however, EXs 4-5 membranes, even without ribs, yielded a low ΔP similar to EXs 2-3. This improvement was presumed owing to their highly porous thick skins, providing a flow pathway that effectively replaced the embossed rib pattern, thereby improving productivity of the film line.

Figure 4:
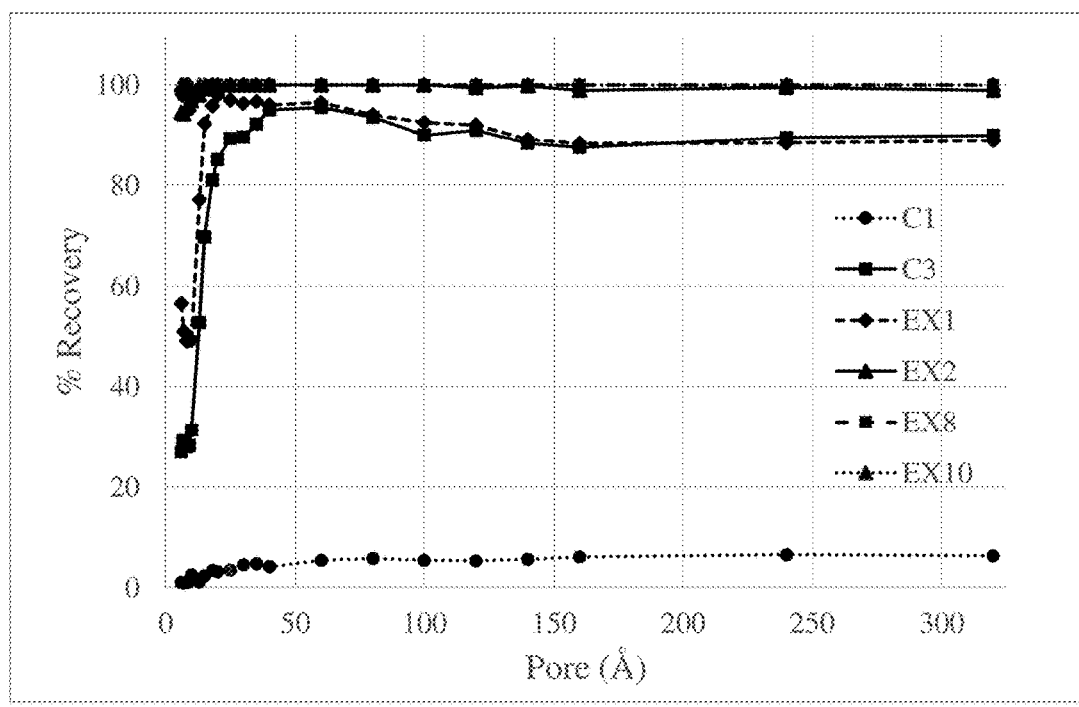
FIG. 4 is a graph of % recovery ($R_{SBT}$) of the initial porosity for the sorbent materials present in the Example membranes as a function of a pore size in the range of 5 to 320 Å.

FIG. 4 shows a plot of % recovery ($R_{SBT}$) of the sorbent porosity present in the processed membrane as a function of a pore size in the micro- and mesopore range from 5 to 320 Å. C1 membrane had a low porosity recovery $R_{SBT}$≤10%, showing occlusion of substantially all the sorbent pores by the diluent. Even after a prolonged drying at 130° C. for 24 hrs, yet C1 membrane increased marginally the pore recovery $R_{SBT}$≤20%; thus, performing poorly in adsorption. C3 membrane showed an improvement, yet lost most microporosity ≤20 Å of the sorbent pores. It was found due in part to good affinity between PAC and LP, which tended to prevent the LP extraction out of the PAC pores. On contrary, EXs 1-10 membranes recovered substantially all the porosity $R_{SBT}$≥85%. Further improvement up to 100% $R_{SBT}$ was made with the solventless sonicator-assisted supercritical fluid extraction process. The combined process was proven also to be highly efficient, leaving behind no residual extractants in the membrane.

In short, the Example membranes showed superior sorption kinetics and capacity far exceeding the Comparative Examples. The membranes were also superior in other properties, i.e., an average pore size ≤500 nm, a film porosity $\phi_P$≤30% upon calendering, a Gurley number $N_G$≤100 s/100 cc, a shrinkage ratio ≤1.5%, a low pressure drop ΔP≤3 and excellent wettability towards polar and/or nonpolar fluids.

Examples 11-22

TABLE 5 shows the layer structure, composition, and process conditions of EXs 11-22. In contrast to C2 film, the Example films were all stable with little or no processing issues. EXs 11-14 were a monolayer film, having a biopolymer matrix except for PA66. The cast sheets were quenched rapidly by setting the roll at 10° C. The monolayer films also differed both in composition and process from C2 and the prior arts. The Example films were variously extracted by combining the novel inventive methods, i.e., ultrasound, supercritical fluids, incompatibilization, low surface tension extractants, high power and green solvents, etc. EXs 11-17 employed sorbents incompatible with diluents. EXs 15-17 were a two-layer film with a rib pattern. EX 15 incorporated an absorbent in the core and an adsorbent in the skin. EX 17 was similar in composition to EX 16, but the film was biaxially oriented without a rib pattern. EXs 18-22 contained mesoporous adsorbents, regenerable and superior in $CO_2$ capture and selectivity. Like EX 17, EX 18 had two skin layers high in diluent content. EXs 19-22 were asymmetric, biaxially oriented 3- and 5-layer films, wherein the skin and core polymers were immiscible. The tie layers of EXs 21-22 were symmetric, composed of the maleated TPE.

TABLE 6 shows the measured properties of EXs 11-22 membranes. EXs 11-14 were 700 μm thick, excluding the rib dimension, and contained 90 wt. % sorbent fillers. The membrane had a denser skin on the roll side. Also, surprisingly, all the monolayer bio-polymer films were ductile with a superior tensile strength STR ≥7.3 MPa and without particle fall-out. This was a huge improvement over the prior art products, and presumed owing to the film structure consisting of a nanofibrous matrix, uniform dispersion of components and a very low content of residual low MW species. EXs 15-22 further improved tensile properties. EX 22 had the skin layers composed essentially of sorbent materials, i.e., a PA66 matrix and sorbent fillers. The membrane was superior in adsorption. Overall, the Example membranes restored substantially all the pristine properties of the sorbent inclusions, $R_{SBT} \geq 90\%$, along with the desirable film properties, i.e., a mean pore size $\leq 500$ nm, a porosity $\phi_P$ of 15 to 80% and a low pressure drop $\Delta P \leq 3$. The oriented membranes were thin $t \leq 100$ µm, with significantly further improved properties.

EXs 11-22 membranes exhibited superior sorption kinetics and capacity, suitable for use as a filter in capturing and/or separating $CO_2$, gaseous and fluidic contaminants, organic volatiles and solvents, solid particles, ions, and etc. In particular, the combinations of different polymers and different sorbents used in the layers of EXs 13-15 improved hydration and sorption capacity of the film, while preventing water penetration through the matrix. In a $CO_2$ removal canister test according to US NAVY Technical Manual (AD-A160181, 1985), EXs 13-15 showed higher rates and more capacities than EXs 11-12. EXs 17-18, on the other hand, had highly porous skins that lowered AP similarly to the rib-patterned flow channels of EXs 11-16, thus eliminating the embossing process. EX 17 membrane was thin, but performed similarly in $CO_2$ removal to the thick membranes of EXs 15-16.

Figure 5:
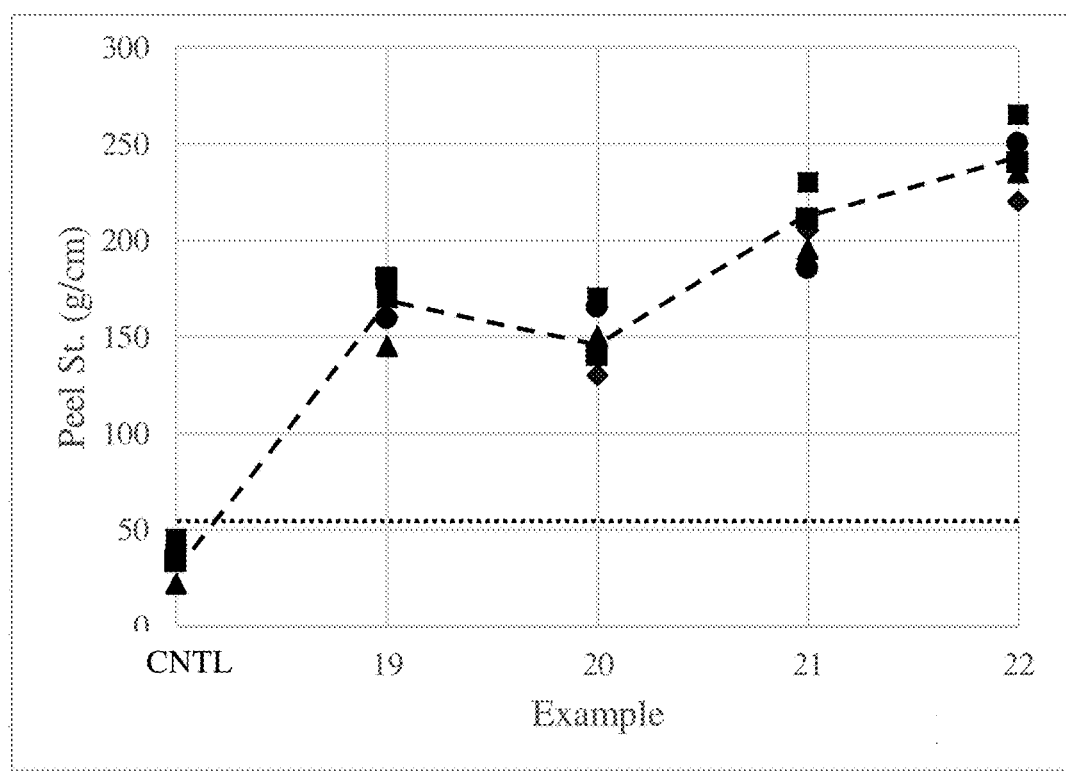
FIG. 5 is a graph of peel strength ($\sigma_P$) for the membranes of Examples 19-22.

As shown in FIG. 5, EXs 19-22 underwent no layer delamination along with a superior peel strength $\sigma_P \geq 150$ g/cm, which was much higher than $\sigma_P \leq 50$ g/cm of a delaminating control sample (CNTL) disclosed in U.S. Pat. Nos. 7,713,636 and 8,142,893. In general, to prevent lay delamination, a multilayer film is required to have $\sigma_P \geq$ about 50 g/cm. EXs 20-21 further increased $\sigma_P \geq 200$ g/cm with a m-TPE tie layer. This unusually strong interface was of great surprise. Without being bound by any theory, it was presumed owing to both miscible species-induced interdiffusion of the dissimilar molecules across the layer boundaries and stress-induced interlocking in-situ of the diffused chains, respectively during the laminar melt and extensional solid flows. EXs 18-22 membranes had superior sorbability, which are regenerable and may effectively replace conventional sorbent beds or sheets being used in a broad range of filter applications. The Example membranes were also found excellent in providing a structural support to a nonsolvent-induced phase inversion (NIPI) membrane.

All documents described herein are incorporated by reference, including any priority documents and/or testing procedures. While various specific embodiments have been illustrated and described, various modifications can be made without departing from the spirit and scope of the disclosure. Accordingly, it is not intended that the disclosure be limited thereby.

TABLE 5

| | | Composition | | | | | Orientation | |
|---|---|---|---|---|---|---|---|---|
| EX | Layer | Polymer (P) | Sorbent (S) | Diluent (D) | P/S/D (wt %) | Rib | Extract | MDX | TDX |
| 11 | Mono | UPP/UPE | Ca(OH)$_2$ | LP | 6/53/40 | ○ | TCE/S | / | / |
| 12 | | β-UPP | LiOH | LP | | | SC—CO$_2$/S | / | / |
| 13 | | UPP | LiOH/13X | LP | | | AZ/S | / | / |
| 14 | | UPE/PA66 | LiOH | DBP | | | SC-CO$_2$/S | / | / |
| 15 | Skin | UPE | PAC | LP | 1/49/50 | ○ | AZ/S | / | / |
| | Core | | LiOH | | 5/45/50 | | | | |
| 16 | Skin | UPE | SiO$_2$ | LP | 1/49/50 | ○ | TCE/S | / | / |
| | Core | | | | 5/45/50 | | | | |
| 17 | Skin | UPE | LiOH | LP | 1/19/80 | X | TCE/S | 3 | 3 |
| | Core | | | | 5/45/50 | | | | |
| 18 | Skin | UPP | ZIF-8 | DPE | 1/19/80 | X | SC-CO$_2$ | 3 | 3 |
| | Core | | MCM-41 | | 8/42/50 | | | | |
| | Skin | | ZIF-8 | | 1/19/80 | | | | |
| 19 | Skin | PET | HKUST-1 | VTO | 5/45/50 | X | AZ/S | 3 | 3 |
| | Core | UPP/PET | 13X | | 8/42/50 | | | | |
| | Skin | PET | HKUST-1 | | 5/45/50 | | | | |
| 20 | Skin | PVDF | PIM-1 | VTO | 4/36/60 | X | TCE/S | 3 | 3 |
| | Core | UPE | PAC | | 8/42/50 | | | | |
| | Skin | PVDF | PIM-1 | | 4/36/60 | | | | |
| 21 | Skin | PVdF-HFP | HKUST-1 | VTO | 2/38/60 | X | SC—CO$_2$/S | 3 | 3 |
| | Tie | m-TPE | SBA-15 | | 5/45/50 | | | | |
| | Core | UPP | | | 8/42/50 | | | | |
| | Tie | m-TPE | | | 5/45/50 | | | | |
| | Skin | PVdF-HFP | PIM-1 | | 2/38/60 | | | | |
| 22 | Skin | PA66 | HKUST-1 | VTO | 2/38/60 | X | SC—CO$_2$/S | 3 | 3 |
| | Tie | m-TPE | m-PAC | | 5/45/50 | | | | |
| | Core | β-UPP | | | 8/42/50 | | | | |
| | Tie | m-TPE | | | 5/45/50 | | | | |
| | Skin | PA66 | PIM-1 | | 2/38/60 | | | | |

TABLE 6

| EX | Membrane Layer | P/S (wt %) | t (μm) | Tensile (MD) STR (MPa) | STN (%) | Porosity (%) $R_{SBT}$ | Film ($\phi_P$) | ΔP | Peel (g/cm) |
|---|---|---|---|---|---|---|---|---|---|
| 11 | Mono | 10/90 | 700 | 8.1 | 11 | 93 | 48 | 1 | / |
| 12 | | | | 7.5 | 15 | 100 | 57 | 1 | / |
| 13 | | | | 7.3 | 11 | 100 | 55 | 1 | / |
| 14 | | | | 8.2 | 12 | 100 | 56 | 1 | / |
| 15 | Skin | 2/95 | 200 | 17.5 | 37 | 99 | 59 | 1 | / |
| | Core | 10/90 | 500 | | | | 53 | | |
| 16 | Skin | 2/98 | 300 | 15.5 | 21 | 100 | 57 | 1 | / |
| | Core | 10/90 | 400 | | | | 52 | | |
| 17 | Skin | 2/98 | 30 | 15.5 | 21 | 100 | 77 | 1 | / |
| | Core | 10/90 | 70 | | | | 52 | | |
| 18 | Skin | 5/95 | 25 | 42.5 | 56 | 95 | 62 | 1 | / |
| | Core | 16/84 | 50 | | | | 22 | | |
| | Skin | 5/95 | 25 | | | | 64 | | |
| 19 | Skin | 10/90 | 20 | 43.8 | 51 | 100 | 16 | 3 | 163 |
| | Core | 16/84 | 60 | | | | 15 | | |
| | Skin | 10/90 | 20 | | | | 18 | | |
| 20 | Skin | 10/90 | 20 | 51.6 | 57 | 100 | 17 | 3 | 151 |
| | Core | 16/84 | 60 | | | | 19 | | |
| | Skin | 10/90 | 20 | | | | 18 | | |
| 21 | Skin | 5/95 | 10 | 45.3 | 42 | 100 | 17 | 3 | 205 |
| | Tie | 10/90 | 15 | | | | 18 | | |
| | Core | 16/84 | 50 | | | | 19 | | |
| | Tie | 10/90 | 15 | | | | 17 | | |
| | Skin | 5/95 | 10 | | | | 16 | | |
| 22 | Skin | 5/95 | 10 | 47.2 | 45 | 100 | 19 | 3 | 242 |
| | Tie | 10/90 | 15 | | | | 17 | | |
| | Core | 16/84 | 50 | | | | 16 | | |
| | Tie | 10/90 | 15 | | | | 16 | | |
| | Skin | 5/95 | 10 | | | | 18 | | |

What is claimed is:

1. A multilayer sorbent polymeric membrane comprising at least one layer comprising: a matrix polymer, sorbent materials of about 100 wt. % or less, and a plurality of interconnecting pores having an average pore size of about 0.1 nm or greater,
   wherein the matrix polymer is a film-forming thermoplastic polymer selected from the group consisting of petroleum-based polymers, bio-based polymers, biodegradable polymers, and combinations thereof;
   wherein the sorbent materials present in the membrane retain their initial sorbability and/or their initial porosity of about 100% or less; and
   wherein the membrane has a porosity of about 85% or less and a Gurley air permeability of about 1 sec/100 cc or greater.

2. The membrane of claim 1, wherein the matrix polymer is selected from the petroleum-based polymers.

3. The membrane of claim 1, wherein the matrix polymer is selected from the bio-based polymers and the biodegradable polymers.

4. The membrane of claim 1, wherein at least one matrix polymer has a weight average molecular weight of about 1,000 g/mole to about 100,000,000 g/mole, a unimodal or multimodal distribution of the molecular weight, and a molecular weight distribution of about 1 to about 100.

5. The membrane of claim 1, wherein at least one matrix polymer is a nonpolar polymer, a polar polymer, or combinations thereof;
   wherein the nonpolar polymer comprises: polyolefin (PO), polystyrene (PS), fluoropolymers (FLPs), thermoplastic elastomers (TPEs) thereof, copolymers thereof, derivatives thereof, or combinations thereof; and
   wherein the polar polymer comprises: polyester, polyamide (PA), fluoropolymers (FLPs), polyether, acrylic polymers (PAcs), polyketone (PK), polyether ether ketone (PEEK), polyphenylene sulfide (PPS), polyimide (PI), polyetherimide (PEI), polybenzimidazole (PBI), polysulfone (PSU), polyethersulfone (PES), polyvinylamine (PVAm), cellulose, polyvinyl alcohol (PVOH), ethylene vinyl alcohol copolymer (EVOH), polysiloxane, thermoplastic starches (TPSs), thermoplastic elastomers (TPEs) thereof, ionomers thereof, copolymers thereof, or combinations thereof.

6. The membrane of claim 5,
   wherein the PO comprises: a) polyethylene (PE) comprising high density PE (HDPE), medium density PE (MDPE), low density PE (LDPE), ultrahigh molecular weight PE (UHMWPE), or combinations thereof; and b) polypropylene (PP) comprising isotactic PP (iPP), high crystalline PP (HCPP), high melt strength PP (HMS-PP), mini-random PP (mr-PP), ultrahigh molecular weight PP (UHMWPP), β-nucleated PP (β-PP), or combinations thereof;
   wherein the polyester comprises: polylactic acid (PLA), polyethylene terephthalate (PET), polytrimethylene terephthalate (PTT), polybutylene terephthalate (PBT), polyethylene naphthalate (PEN), polybutylene naphthalate (PBN), polyethylene furanoate (PEF), polybutylene furanoate (PBF), polycarbonate (PC), polycyclohexylenedimethylene terephthalate (PCT), or combinations thereof;
   wherein the PA comprises: PA6, PA11, PA12, PA46, PA66, PA410, PA610, PA612, PA1010, PA1012, PA MXD6, PA6T, PA8T, PA10T, polyphthalamide (PPA), PA6T/DT (D: 2-methyl pentamethylene diamine), or combinations thereof; and wherein the FLPs comprise: polyvinylidene fluoride (PVDF), poly(vinylidene fluoride-co-hexafluoropropylene) (PVdFHFP), poly(tetrafluoroethylene-co-perfluoropropyl vinyl ether) (PTFE-c-PFPVE), poly(vinyl fluoride) (PVF), polychlorotrifluoroethylene (PCTFE), copolymers of tetrafluoroethylene and ethylene (ETFE), polyethylenechlorotrifluoroethylene (ECTFE), perfluorinated ethylenepropylene copolymer (FEP), tetrafluoroethylene-perfluorovinyl ether copolymer (PFA), or combinations thereof.

7. The membrane of claim 6, wherein the at least one matrix polymer is β-PP comprising a β-nucleating agent (β-NA) of about 3 wt. % or less, wherein the PP comprises: iPP, syndiotactic PP (sPP), HCPP, HMS-PP, mr-PP, UHM-WPP, copolymers thereof, or combinations thereof; and
wherein the β-NA comprises: N,N'-dicyclohexyl-2,6-naphthalene dicarboxamide, quinacridones, calcium pimelates, calcium suberates, calcium phthalates, calcium salts of 3,9-bis[4-(N-cyclohexylcarbamoyl)phenyl]-2,4,8,10-tetraoxaspiro[5.5]undecane, calcium dicarboxylates, nanosized salts of dicarboxylic acids, derivatives thereof, or combinations thereof.

8. The membrane of claim 1, wherein at least one matrix polymer is a miscible blend, an immiscible blend, a compatibilizer, or combinations thereof.

9. The membrane of claim 8, wherein the compatibilizer comprises polar-modified polymers, copolymers, TPEs, nanofillers, or combinations thereof.

10. The membrane of claim 1, wherein the sorbent materials are selected from the group consisting of metal and metalloid oxides, metal and metalloid hydroxides, carbonaceous materials, siliceous materials, zeolites, metal-organic frameworks (MOFs), porous polymers, sorbent polymers, derivatives thereof, and combinations thereof.

11. The membrane of claim 10, wherein the sorbent materials are porous, substantially microporous, substantially mesoporous, or substantially macroporous.

12. The membrane of claim 10, wherein the sorbent materials are sorbent fillers characterized by a bulk density of about 3.5 g/cc or less, an average particle size of about 100 μm or less, a pore volume of about 3.5 cc/g or less, an aspect ratio of about 2,000 or less, a Brunauer-Emmett-Teller (BET) surface area of about 5,000 m²/g or less, or combinations thereof.

13. The membrane of claim 12, wherein the average particle size is about 1 nm to about 1,000 nm.

14. The membrane of claim 10,
wherein the metal and metalloid compounds comprise: $Li_2O$, CaO, ZnO, $TiO_2$, $ZrO_2$, $SiO_2$, $SiO_x$ ($1 \leq x \leq 3$), $Al_2O_3$, $AlO_x$ ($1 \leq x \leq 3$), LiOH, $Ca(OH)_2$, γ-AlO(OH), or combinations thereof;
wherein the carbonaceous materials comprise: activated carbons, carbon fibers, carbon nanotubes, graphenes, graphene oxides, mesoporous carbons, carbon molecular sieves, or combinations thereof;
wherein the siliceous materials comprise: precipitated silica, fumed silica, organosilica, mesoporous silica, phyllosilicates, organosilicates, aerogels, MCM-41, SBA-15, or combinations thereof;
wherein the zeolites comprise: zeolite A, zeolite X, ZSM, mesoporous zeolites, zeotypes, or combinations thereof;
wherein the metal-organic frameworks (MOFs) comprise: zeolitic imidazolate frameworks (ZIFs), ZIF-8, ZIF-67, HKUST-1, MIL-53, MIL-101, MOF-74, UiO-66, UiO-66-$NH_2$, derivatives thereof, or combinations thereof; and wherein the porous or sorbent polymers comprise: hyper-crosslinked polymers (HCPs), covalent organic frameworks (COFs), polymers of intrinsic microporosity (PIMs), conjugated polymers, fluorinated polymers, polytrimethylsilyl propyne (PTMSP), polysaccharides, copolymers thereof, or combinations thereof.

15. The membrane of claim 1, wherein the membrane is substantially unoriented; and has a thickness of about 0.1 mm to about 3 mm, a porosity of about 5% to about 70%, an average pore size of about 50 μm or less, a Gurley air permeability of 1,000 sec/100 cc or less, a tensile strength of about 0.1 MPa or greater in the machine direction (MD) and/or the transverse direction (TD), a peel strength of about 30 g/cm or greater, or combinations thereof.

16. The membrane of claim 15, wherein at least one portion of at least one outer surface of the unoriented membrane is embossed with a flow channel pattern at any angle along the MD.

17. The membrane of claim 1, wherein the membrane is oriented in at least one direction; and has a thickness of about 1 μm to about 30 μm, a porosity of about 20% to about 85%, an average pore size of about 1 nm to about 1 μm, a Gurley air permeability of about 1,000 sec/100 cc or less, a crystalline melting temperature (Tm) of about 125° C. to about 350° C., a tensile strength of about 10 MPa or greater in the MD and/or the TD, a peel strength of about 30 g/cm or greater, or combinations thereof.

18. The membrane of claim 1, wherein the membrane comprises at least one outer layer having a porosity characterized by a porosity ratio of about 0.01 to about 100 relative to the porosity of an inner layer, an average pore size characterized by a size ratio of about 0.001 to about 1,000 relative to the average pore size of an inner layer, or combinations thereof.

19. The membrane of claim 1, wherein at least one portion of at least one outer surface of the membrane is coated with a layer of coating, crosslinking, or both,
wherein the coated layer has a thickness of about 50% or less of the total film thickness; and
wherein the coated layer comprises at least one component selected from the group consisting of metal oxides, $SiO_2$, $SiO_x$ ($1 \leq x \leq 3$), $Al_2O_3$, $AlO_x$ ($1 \leq x \leq 3$), $TiO_2$, silicates, zeolites, graphenes, MOFs, ZIFs, UiO-66-$NH_2$, PO, polar modified PO (p-m-PO), olefin block copolymers (OBCs), p-m-OBCs, styrenic block copolymers (SBC), p-m-SBCs, PVOH, PAc, PSU, PVDF, cellulose acetates, chitosans, aromatic PA, PIMs, PTMSP, PI, polyamide imide (PAI), polydopamine, TPEs thereof, ionomers thereof, derivatives thereof, and combinations thereof.

20. The membrane of claim 19, wherein the coated layer is porous having a porosity characterized by a porosity ratio of about 0.01 to about 100 relative to the porosity of an inner layer, an average pore size characterized by a size ratio of about 0.001 to about 1,000 relative to the average pore size of an inner layer, or combinations thereof.

21. The membrane of claim 1, wherein the membrane comprises a matrix polymer of about 100 wt. % or less, the sorbent materials of about 0 wt. % to about 99 wt. %, and a nucleating agent of about 0 wt. % to about 20 wt. %; and consists essentially of:
 a) a monolayer consisting of the at least one layer;
 b) two layers consisting of a first layer and a second layer disposed on a side of the first layer;
 c) three layers consisting of the first layer, the second layer, and a third layer disposed on a side of the first layer opposite the second layer;

d) four layers consisting of the first layer, the second layer, the third layer, and a fourth layer disposed on a side of the second layer; or e) five layers consisting of the first layer, the second layer, the third layer, the fourth layer, and a fifth layer disposed on a side of the third layer opposite the fourth layer.

22. The membrane of claim 21, wherein the membrane is the monolayer membrane.

23. The membrane of claim 21, wherein the membrane is:
a) the two-layer membrane comprising a first layer (A), a second layer (B), and a layer structure of B/A, wherein the A and B layers differ from each other in matrix polymer or composition;
b) the three-layer membrane comprising the first layer (A), the second layer (B), and a layer structure of B/A/B or A/B/A;
c) the four-layer membrane further comprising a fourth layer (C) with a layer structure of B/C/A/B or A/C/B/A; or
d) the five-layer membrane comprising a layer structure of B/C/A/C/B or A/C/B/C/A.

24. The membrane of claim 23, wherein the matrix polymer of the A layer is PK.

25. The membrane of claim 23, wherein the matrix polymer of the A layer is PPS.

26. The membrane of claim 23, wherein the matrix polymer of the B layer is β-PP.

27. The membrane of claim 23, wherein the matrix polymers of the A and B layers are PO.

28. The membrane of claim 27, wherein: a) the PO of the A layer matrix polymer is HDPE, MDPE, LDPE, UHMWPE, copolymers thereof, or combinations thereof; and b) the PO of the B layer matrix polymer is PP, β-PP, iPP, HCPP, HMS-PP, mr-PP, UHMWPP, copolymers thereof, or combinations thereof.

29. The membrane of claim 23, wherein: a) the matrix polymer of the A layer is PO; and b) the matrix polymer of the B layer is PK, PEEK, PPS, polyester, PA, FLPs, ionomers thereof, copolymers thereof, or combinations thereof.

30. The membrane of claim 23, wherein the matrix polymers of the A and B layers are polyester.

31. The membrane of claim 30, wherein: a) the polyester of the A layer matrix polymer is PET, PEN, PEF, copolymers thereof, or combinations thereof; and b) the polyester of the B layer matrix polymer is PTT, PBT, PBN, PBF, PCT, PC, PLA, copolymers thereof, or combinations thereof.

32. The membrane of claim 23, wherein: a) the matrix polymer of the A layer is polyester; and b) the matrix polymer of the B layer is PK, PEEK, PPS, PA, PI, PEI, PSU, PES, ionomers thereof, copolymers thereof, or combinations thereof.

33. The membrane of claim 23, wherein the matrix polymers of the A and B layers are PA.

34. The membrane of claim 33, wherein: a) the PA of the A layer matrix polymer is PA6T, PAST, PA10T, PPA, PA6T/DT, copolymers thereof, or combinations thereof; and b) the PA of the B layer matrix polymer is PA6, PA11, PA12, PA46, PA66, PA410, PA610, PA612, PA1010, PA1012, PA MXD6, copolymers thereof, or combinations thereof.

35. The membrane of claim 23, wherein: a) the matrix polymer of the A layer is PA; and b) the matrix polymer of the B layer is PK, PEEK, PPS, PI, PEI, PSU, PES, ionomers thereof, copolymers thereof, or combinations thereof.

36. The membrane of claim 23, wherein at least one outer layer of the membrane comprises about 99 wt. % or less of the sorbent fillers comprising: MgO, ZnO, CaO, $SiO_2$, $SiO_x$ ($1 \leq x \leq 3$), $TiO_2$, $ZrO_2$, $CaCO_3$, $BaTiO_3$, $Al_2O_3$, $AlO_x$ ($1 \leq x \leq 3$), $B_2O_3$, $BaSO_4$, $Nb_2O_5$, $Ta_2O_5$, silicates, zeolites, graphenes, COFs, MOFs, ZIFs, UiO-66-$NH_2$, derivatives thereof, or combinations thereof.

37. The membrane of claim 6, wherein the membrane is made by a method comprising:
a) (co)extruding layer-forming compositions comprising a matrix polymer to form a multilayer (co)extrudate, wherein at least one of the layer-forming compositions further comprising the sorbent materials and a diluent;
b) cooling the multilayer (co)extrudate to form a multilayer film;
c) extracting the diluent from the multilayer film with an extractant; and
d) removing the extractant from the extracted film to form the multilayer sorbent polymeric membrane.

38. The membrane of claim 37, wherein the diluent is selected from the group consisting of hydrocarbons, mineral oils, paraffinic oils, naphthenic oils, renewable oils, ethers, amides, amines, alcohols, esters, ketones, acids, aldehydes, sulfones, sulfoxides, derivatives thereof, and combinations thereof.

39. The membrane of claim 38, wherein the renewable oils are: a) characterized by an iodine value of about 150 g $I_2$/100 g or lower, an oleic content of about 50% or higher, an oxidation stability index (OSI) of about 5 hours or greater, or combinations thereof; or b) selected from the group consisting of soybean oils, genetically modified soybean oils, high oleic soybean oils, hydrogenated soybean oils, epoxidized soybean oils, hydroxylated soybean polymerized soybean oils, modified soybean oils, vegetable oils, genetically modified vegetable oils, high oleic vegetable oils, hydrogenated vegetable oils, epoxidized vegetable oils, hydroxylated vegetable oils, polymerized vegetable oils, modified vegetable oils, high oleic canola oils, high oleic sunflower oils, palm oil, palm kernel oil, castor oil, coconut oil, olive oil, derivatives thereof, and combinations thereof.

40. The membrane of claim 39, wherein the at least one matrix polymer is PO.

41. The membrane of claim 39, wherein the membrane is a monolayer membrane.

42. The membrane of claim 37, wherein the extraction method further comprises an ultrasonic extraction.

43. The membrane of claim 37, wherein the extractant is selected from the group consisting of subcritical fluids, supercritical fluids (SCFs), mixtures of supercritical fluids (SCFs) and polar solvents, alkyl acetates, organic carbonates, n-propyl bromide (nPB), amides, alcohols, ketones, ethers, esters, hydrocarbons, ionic liquids, halogenated hydrocarbons, halogenated ethers, azeotropes of halogenated fluids, derivatives thereof, and combinations thereof.

44. The membrane of claim 43, wherein the subcritical or supercritical fluids comprise carbon dioxide ($CO_2$).

45. An article, cartridge, module, electrolyte battery, or energy storage device comprising the membrane of claim 39 as a separator or a filter.

46. An electrolyte battery, energy storage device, article, cartridge, or module comprising the membrane of claim 21 as a separator or a filter.

47. An electrolyte battery, energy storage device, article, cartridge, or module comprising the membrane of claim 19 as a separator or a filter.

48. An electrolyte battery, energy storage device, article, cartridge, or module comprising the membrane of claim 17 as a separator or a filter.

49. An electrolyte battery, energy storage device, article, cartridge, or module comprising the membrane of claim 15 as a separator or a filter.

50. An electrolyte battery, energy storage device, article, cartridge, or module comprising the membrane of claim 10 as a separator or a filter.

51. An electrolyte battery, energy storage device, article, cartridge, or module comprising the membrane of claim 6 as a separator or a filter.

52. An article, cartridge, module, battery, energy storage device, packaging, or printing material comprising the membrane of claim 1.

\* \* \* \* \*